United States Patent
Meisel

(10) Patent No.: US 9,305,553 B2
(45) Date of Patent: Apr. 5, 2016

(54) SPEECH RECOGNITION ACCURACY IMPROVEMENT THROUGH SPEAKER CATEGORIES

(76) Inventor: William S. Meisel, Tarzana, CA (US)

(*) Notice: Subject to any disclaimer, the term of this patent is extended or adjusted under 35 U.S.C. 154(b) by 1250 days.

(21) Appl. No.: 13/096,249

(22) Filed: Apr. 28, 2011

(65) Prior Publication Data
US 2011/0295603 A1 Dec. 1, 2011

Related U.S. Application Data

(60) Provisional application No. 61/328,747, filed on Apr. 28, 2010.

(51) Int. Cl.
| | |
|---|---|
| *G10L 15/00* | (2013.01) |
| *G10L 15/06* | (2013.01) |
| *G10L 15/32* | (2013.01) |
| *G10L 15/07* | (2013.01) |
| *G10L 15/30* | (2013.01) |

(52) U.S. Cl.
CPC .......... *G10L 15/32* (2013.01); *G10L 15/07* (2013.01); *G10L 15/30* (2013.01)

(58) Field of Classification Search
CPC ....... G10L 15/00; G10L 15/06; G10L 15/063; G10L 15/065; G10L 15/067; G10L 15/075; G10L 25/26; G10L 15/265; G10L 2015/00; G10L 2015/06; G10L 2015/063; G10L 2015/0631; G10L 2015/0635
USPC ............. 704/270, 270.1, 275, 231, 236, 238, 704/239, 246, 249, 250, 251, 254, 255; 379/88.01
See application file for complete search history.

(56) References Cited

U.S. PATENT DOCUMENTS

| | | | | |
|---|---|---|---|---|
| 5,983,178 A | * | 11/1999 | Naito et al. | 704/245 |
| 6,073,096 A | * | 6/2000 | Gao et al. | 704/245 |
| 6,332,122 B1 | * | 12/2001 | Ortega et al. | 704/270 |
| 6,442,519 B1 | * | 8/2002 | Kanevsky et al. | 704/243 |
| 6,526,379 B1 | * | 2/2003 | Rigazio et al. | 704/245 |
| 6,567,776 B1 | * | 5/2003 | Chang et al. | 704/236 |

(Continued)

OTHER PUBLICATIONS

Huang, et al., Spoken Language Processing: A Guide to Theory, Algorithm and System Development, Prentice-Hall, 2001, Chapter 1: Introduction, pp. 1-15.

(Continued)

*Primary Examiner* — Paras D Shah
(74) *Attorney, Agent, or Firm* — Fish & Richardson P.C.

(57) ABSTRACT

Methods, systems, and apparatus, including computer programs encoded on a computer storage medium, for speech recognition. In one aspect, a computer-based method includes receiving a speech corpus at a speech management server system that includes multiple speech recognition engines tuned to different speaker types; using the speech recognition engines to associate the received speech corpus with a selected one of multiple different speaker types; and sending a speaker category identification code that corresponds to the associated speaker type from the speech management server system over a network. The speaker category identification code can be used by any one of speech-interactive applications coupled to the network to select one of an appropriate one of multiple application-accessible speech recognition engines tuned to the different speaker types in response to an indication that a user accessing the application is associated with a particular one of the speaker category identification codes.

22 Claims, 10 Drawing Sheets

(56) References Cited

U.S. PATENT DOCUMENTS

| | | | |
|---|---|---|---|
| 6,684,186 B2* | 1/2004 | Beigi et al. | 704/246 |
| 7,171,360 B2* | 1/2007 | Huang et al. | 704/245 |
| 7,216,076 B2* | 5/2007 | Atal | 704/238 |
| 7,457,745 B2* | 11/2008 | Kadambe et al. | 704/216 |
| 7,590,537 B2* | 9/2009 | Kim et al. | 704/245 |
| 2004/0083104 A1* | 4/2004 | Liu et al. | 704/256 |

OTHER PUBLICATIONS

Huang, et al., Spoken Language Processing: A Guide to Theory, Algorithm and System Development, Prentice-Hall, 2001, Chapter 8: Hidden Markov Models, pp. 377-413.

Huang, et al., Spoken Language Processing: A Guide to Theory, Algorithm and System Development, Prentice-Hall, 2001, Chapter 11: Language Modeling, pp. 545-590.

Meisel, William S., Computer-Oriented Approaches to Pattern Recognition, Academic Press, 1972, pp. 129-160.

Theodoridis et al., Pattern Recognition, Academic Press, 4th edition, 2008, Chapter 1: Introduction, pp. 1-12.

Theodoridis et al., Pattern Recognition, Academic Press, 4th edition, 2008, Chapter 11: Clustering: Basic Concepts, pp. 595-625.

Xu et al., Clustering, Wiley-IEEE Press, 2008, Chapter 1: Cluster Analysis, pp. 1-13.

* cited by examiner

SPEECH RECOGNITION ACCURACY IMPROVEMENT THROUGH SPEAKER CATEGORIES

CROSS-REFERENCE TO RELATED APPLICATION

This application claims the benefit under 35 U.S.C. §119 (e) of U.S. patent application Ser. No. 61/328,747, entitled "Personalization and efficiency in multi-vendor services using speech recognition," filed Apr. 28, 2010, which is incorporated herein by reference in its entirety.

BACKGROUND

This specification relates to speech recognition and, more particularly, to a system and method for providing accurate and efficient speech recognition.

Applications using speech recognition are becoming increasingly popular, sometimes in combination with other user interface modalities such as touch screens. Examples of such applications include dialing a phone by speaking a person's name, composing a text message by voice, voice search (of the web), navigating phone features by voice control, interacting with directory assistance by speaking, choosing songs by speaking, transcribing voicemails to text, automated customer service, searching audio/video sources by spoken keywords, obtaining information such as stock quotes and movie times by voice interaction, shopping comparisons by voice, dictating medical or legal reports, and more.

SUMMARY

This specification describes technologies relating to speech recognition.

In general, one innovative aspect of the subject matter described in this specification can be embodied in methods that include a computer-based method that includes: receiving a speech corpus at a speech management server system that includes a plurality of speech recognition engines tuned to different speaker types; using the speech recognition engines to associate the received speech corpus with a selected one of a plurality of the speaker types; and sending a speaker category identification code that corresponds to the associated speaker type from the speech management server system over a network. The speaker category identification code can be used by one or more applications coupled to the network that offer speech recognition to select one of a plurality of application-accessible speech recognition engines tuned to the different speaker types in response to an indication that a user accessing the application is associated with a particular one of the speaker category identification codes.

In a typical implementation, the received speech corpus includes an audio file of a speech sample spoken into a network device coupled to the network.

According to some embodiments, using the speech recognition engines to associate the received speech corpus with a selected one of a plurality of the speaker types includes: producing a recognized version of the received speech corpus with each of the speech recognition engines; and identifying which of the produced versions of the received speech corpus is the most accurate.

Certain embodiments include prompting the user to read aloud a selection of text into a microphone in or coupled to a selected one of a plurality of network device coupled to the network. This provides an independent source of the contents of the speech corpus and can be used in the method of the previous paragraph to assess accuracy.

Sending the speaker category identification code can, in some instances, include sending the speaker category identification code to the user at the selected network device so that the user can provide the speaker category identification code to one of the applications to enable the application to use the speaker category identification code to improve speech recognition accuracy.

According to certain implementations, receiving the speech corpus includes receiving a plurality of speech corpuses from a database of a particular one of the applications coupled to the network.

In some embodiments, the computer-based method includes: using the speech recognition engines to associate each of the speech corpuses with a selected one of the speaker types; and sending to the particular application an indication of which one of the speaker category identification codes is associated with each of the plurality of speech corpuses, respectively.

The database may be maintained by or on behalf of the particular application.

In certain implementations, the computer-based method includes organizing the plurality of speech corpuses at the particular application into clusters based on their associated speaker types. Additionally, the computer-based method sometimes includes creating an application-accessible speech recognition engine for each cluster from the data in the cluster.

According to some embodiments, the speech corpus comprises receiving the speech corpus from a particular one of the plurality of applications based on a selection of text that was read aloud by the user into one of the network devices while interacting with the particular application. Sending the speaker category identification code over the network can include sending the speaker category identification code to the particular application. The computer-based method also can include utilizing, at the particular application, a selected one of the application-accessible speech recognition engines that is tuned to the speaker type that corresponds to the sent speaker category identification code for subsequent interactions with the user.

In certain implementations, the computer-based method includes: enabling the user to learn which of the speaker identification codes corresponds to him or her by engaging in a voluntary enrollment process independent of any of the applications through interacting directly with the speech management server system over the network and speaking text into a network device as prompted the speech management server system.

The computer-based method also can include enabling the user to learn which of the speaker identification codes corresponds to him or her by engaging in a voluntary enrollment process independent of any of the applications through submitting a recording dictated to the speech management server system. The speech management server system preprocesses the recording with a speaker-independent speech recognition engine to produce a transcription of the recording that is used together with the recording as the received corpus to identify the corresponding speaker identification code.

In some implementations, at least one of the applications is adapted to prompt the user to read a selection of text into one of the network devices, the application transmits the selection of text and an audio file of the user's reading to the speech management server system and the speech management server system sends the application the corresponding speaker identification code.

In some implementations, the application uses a speaker-independent speech recognition engine to initially recognize users' speech when accessing the application; and uses speech collected during users' interactions with the application through the speaker-independent speech recognition engine to create the speech corpus.

In another aspect, a computer-based method includes storing a collection of speech corpuses in a database of a memory storage device, wherein each speech corpus is from a single speaker and comprises an audio file of speech and a transcription of the audio file; organizing the speech corpuses into clusters based on similarity from a speech recognition perspective; and assigning a unique speaker category identification code to each of the clusters.

In some implementations, organizing the speech corpuses into clusters includes: creating one or more speech recognition engines based on parameters associated with one or more of the speech corpuses; producing recognized versions of one or more of the speech corpuses with one or more of the speech recognition engines; calculating distances between the speech corpuses based on the recognized versions of the speech corpuses; and clustering the speech corpuses based on the calculated distances.

According to certain embodiments, creating the one or more speech recognition engines comprises: applying one or more statistically-based speech recognition algorithms to the speech corpuses.

In some implementations, organizing the speech corpuses into clusters includes: (a) creating a first speech recognition engine based on a first one of the speech corpuses; (b) applying the first speech recognition engine to produce a recognized version of a second one of the speech corpuses; and (c) calculating a first edit distance between the recognized version of the second one of the speech corpuses and the transcription of the second one of the speech corpuses.

In certain embodiments, organizing the speech corpuses into clusters further includes: (d) organizing the second speech corpus into the same cluster as the first speech corpus if the first edit distance is less than a particular value.

According to some implementations, organizing the speech corpuses into clusters further includes: (d) creating a second speech recognition engine based on the second one of the speech corpuses; (e) applying the second speech recognition engine to produce a recognized version of the first speech corpus; and (f) calculating a second edit distance between the recognized version of the first speech corpus and the transcription of the first one of the speech corpuses. This method also can include: (g) calculating an effective edit distance between the first speech corpus and the second speech corpus based on the first and second edit distances; and (h) organizing the first and second speech corpuses into the same cluster if the effective edit distance is less than a particular value.

In some embodiments, organizing the speech corpuses into clusters based on similarity from a speech recognition perspective includes identifying two of the speech corpuses that are most dissimilar from a speech recognition perspective; creating a first cluster associated with a first one of the identified speech corpuses and a second cluster associated with a second one of the identified speech corpuses; organizing all of the speech corpuses that are more similar to the first one of the identified speech corpuses than to the second one of the identified speech corpuses into the first cluster; and organizing all of the speech corpuses that are more similar to the second one of the identified speech corpuses than to the first one of the identified speech corpuses into the second cluster.

In some instances, organizing the speech corpuses into clusters based on similarity from a speech recognition perspective includes creating the clusters without expressing the clusters explicitly as points in a Euclidian space, but by using distances between the clusters, wherein the distances are measured by using one or more of the speech recognition engines to facilitate creating a distance measure between any two of the speech corpuses.

Organizing the speech corpuses into clusters based on similarity from a speech recognition perspective sometimes includes: representing each one of the speech corpuses as a point in a Euclidean space; and using one or more of the speech recognition engines to determine a distance measure in the Euclidian space between pairs of the speech corpuses. In such instances, N corpuses correspond to an (N−1) dimensional Euclidian space to preserve the distances measures, and the (N−1) dimensional Euclidian space can be reduced in dimension and thus made denser by implementing one or more statistical methods.

In some implementations, each of the unique speaker identification codes includes information that facilitates identifying one or more other clusters that are related to the corresponding cluster from a speech recognition perspective.

The computer-based method can, in some instances, include: reorganizing all of the speech corpuses associated with a first one of the speaker identification codes and a second speaker identification code into one new cluster based on information in the first or second speaker identification codes that indicates the corresponding clusters are related to one another from a speech recognition perspective, allowing one speech recognition engine to be generated that applies to the two speaker identification codes.

In certain embodiments, one or more of the speaker identification codes identify an environment in which the speech sample was created.

In yet another aspect, a speech management server system may be coupled to a network. The speech management server system includes a processing module with a plurality of speech recognition engines, wherein each speech recognition engine is tuned to a respective one of a plurality of different speaker types, each of which corresponds to one of a plurality of speaker identification codes; a transceiver that enables the speech management server system to communicate over the network; and a processing module adapted to apply the plurality of speech recognition engines to a speech corpus received at the transceiver to identify a particular one of the speaker types that is most similar to the received speech corpus from a speech recognition perspective. The transceiver may be adapted to send over the network an indication of the speaker category identification code that corresponds with the identified speaker type.

In certain implementations, the speaker category identification code can be used by one or more applications coupled to the network that offer speech recognition to select one of a plurality of application-accessible speech recognition engines tuned to the different speaker types in response to an indication that a user accessing the application is associated with a particular one of the speaker category identification codes.

In some embodiments, the received speech corpus includes: an audio file of a speech sample spoken into a network device coupled to the network.

In some embodiments, the speech corpus received by the Speech Management server system is one of a plurality of speech corpuses that were received from an application coupled to the network, and wherein the speech management server is adapted to return to the application an associated one of the speaker category identification codes for each of the plurality of speech corpuses.

According to certain embodiments, the received speech corpus is from an application coupled to the network and was originated by a user speaking into one of a plurality of network devices coupled to the network, and wherein the speech management server system is adapted to associate the received speech corpus with one of the clusters based on similarity from a speech recognition perspective.

In still another aspect, a computer system includes: a memory storage device with a database storing a collection of speech corpuses, wherein each speech corpus comprises an audio file of speech and a transcription of the audio file; a speech recognition engine generation module to create one or more speech recognition engines based on parameters associated with one or more of the speech corpuses; one or more speech recognition engines created with the speech recognition engine generation module, wherein each speech recognition engine is adapted to produce a recognized version of one or more of the audio files of the speech corpuses; a comparison module to calculate distances between two or more of the speech corpuses based on the recognized versions; and a clustering module to organize the speech corpuses into clusters based on the calculated distances.

In certain instances, the computer system is adapted to assign a unique speaker category identification code to each of the clusters.

The speech recognition engine generation module can, in certain instances, be further adapted to: (a) create a first speech recognition engine based on a first one of the speech corpuses; and (b) apply the first speech recognition engine to produce a recognized version of a second one of the speech corpuses. In these instances, the comparison module is further adapted to calculate the distance as a first edit distance between the recognized version of the second one of the speech corpuses and the transcription of the second one of the speech corpuses.

According to some embodiments, the clustering module is further adapted to organize the second speech corpus into the same cluster as the first speech corpus if the first edit distance is less than a particular value.

The speech recognition engine generation module can be further adapted to: (c) create a second speech recognition engine based on the second one of the speech corpuses; and (d) apply the second speech recognition engine to produce a recognized version of the first speech corpus. In such instances, the comparison module is further adapted to calculate a second edit distance between the recognized version of the first speech corpus and the transcription of the first one of the speech corpuses.

In some implementations, the comparison module is further adapted to: calculate an effective edit distance between the first speech corpus and the second speech corpus based on the first and second edit distances; and organize the first and second speech corpuses into the same cluster if the effective edit distance is less than a particular value.

According to certain embodiments, a speech recognition engine is created for each speaker category code for use by an application provider when the speaker category code is provided to the application.

Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages.

For example, the present disclosure can provide for a computationally simple technique for providing highly accurate speech recognition technology without requiring that the specific application implement a lengthy enrollment or adaption process. In speech recognition, there are many categories of speech that differ by individual. These include accents and differences created by physical differences in the vocal tract, for example, and may be related to gender or age differences. The fact that humans can recognize speakers by their differing voice characteristics indicates implicitly the variability in human voices. The present disclosure relates generally to improving accuracy and efficiency in applications (including services) that use speech recognition. In a typical implementation, an application uses a code that identifies a category of speaker from speech type and may, in some instances, avoid the need for the particular application to either spend what typically is an extended period of time "enrolling" the speaker or "adapting" to the speaker and still have the accuracy advantages of having adapted to the speaker.

In certain implementations, the benefits of tuning more closely to an individual speaker go beyond improved accuracy. A speaker-independent system is generally much more complex than a speaker-dependent system, since it typically implicitly includes parameters that cover wide variations, e.g., both male and female speakers. A system which is provided information at the start as to the category of the speaker can be much simpler, and thus more efficient computationally. At the same time, since it is specific to the speaker, it will be more accurate. The techniques disclosed herein achieve this objective without requiring speaker-specific enrollment or adaptation by each application.

Speech is also affected by other factors largely unrelated to the speaker, e.g., the device being used (e.g., a mobile versus landline phone versus a PC microphone) and the environment (e.g., noisy background) and the application (e.g., address entry in a navigation system versus general voice search in a web browser). A couple of approaches to address these different factors include: (1) to make a recognition system specific to a narrow category, requiring creating many specific recognizers to be created that may fail when minor unanticipated changes occur, or (2) to make the recognition system very general across a wide range of variables, reducing its overall accuracy and increasing the computational load because of model complexity. In some implementations, the present disclosure provides a way to characterize a combination of speaker characteristics with other factors (such as those above) in a parsimonious way, so that there are a manageable number of categories to address, in a manner that is efficient to the users and service.

Some embodiments of the methods in this document generally improve the accuracy and response speed of speech recognition applications, while simultaneously reducing processing power and memory requirements to accomplish those goals. The method described herein characterizes speakers into groups and subgroups with labels that can be used by any speech recognition system to immediately use an appropriately tuned model, providing accuracy and efficiency benefits typically without requiring an enrollment or adaptation process by the application. A particular user typically goes through a one-time enrollment process that applies to all services and applications; the enrollment provides an identification code as to speaker category. An individual user may be motivated to go through this process once to achieve improved accuracy for multiple speech recognition services, e.g., voice search on mobile phones, dictation into PCs, navigation systems in automobiles, and automated directory assistance. The identification code may be either entered once when associated with a calling phone number, or at the start of the interaction when requested. Entry can be automatic by software or a network device or manually by the user. The speaker categories can, in some instances, specific to a device, such as a mobile phone.

In certain implementations, the techniques disclosed herein support multiple, independent applications from multiple companies that use speech recognition, allowing those services to have some advantages of category-dependent recognition in improved accuracy and reduced processing when a user registers with a simple code. The user may be motivated to register with the service that determines category identification codes, because supplying them to a new service creates an enhanced experience. Typically, the service that derives and assigns the speaker category identification codes (i.e., the service provided by the speech management server system) can work entirely from voice samples without asking questions such as gender or age of the user. The user's name need not even be provided to get, for example, a speaker category identification code, particularly when the speaker category identification code is delivered to the user and entirely controlled by the user.

In a typical implementation, multiple users will be assigned the same speech category identification code. This enhances system effectiveness and efficiency. The use of a category ID that is entered easily (e.g., a three-digit integer) makes the approach relatively easy to implement, both for users and for companies receiving the information. An efficient methodology for creating a compact speaker characterization and using that characterization is disclosed herein.

Typically, the characterization of the user is focused on the characteristics of the user's speech, since that is often a primary determinant of speech recognition accuracy. Another aspect of speech recognition is language models, which are sometimes implemented in association with the other techniques disclosed herein. Language models describe the way users use words in combination. A general approach to a language model is a statistical language model (SLM), which typically lists the probability of "trigrams" (three-word-combinations) occurring in speech. Such models can show, for example, that "how are you" is more probable than "how or U." Another approach for more narrow applications may be a "defined grammar," which in effect lists all the full phrases the user may say that can be recognized (albeit in a more condensed format). A personal contact list for voice dialing in a mobile phone is an example of a defined grammar. Both methods have refinements that make them more effective, e.g., using categories such as proper names in a SLM so that a new name can be added by augmenting a name list rather than recompiling the SLM. In defined grammars, "garbage words" are sometimes used to indicate non-information parts of an utterance that may vary, e.g., "I want," "Give me," "Uhh," etc., at the start of a customer service request.

A general language model is least restrictive, but typically needs to cover many applications and many individuals. This can lead to reduced accuracy by including variations that a specific individual is unlikely to use or bias the results toward a more common interpretation when a narrower one is used often. As an example, an individual living in Tarzana, Calif., may find "Tarzana" being interpreted as "Tarzan a" because of a low frequency of "Tarzana" in the text database used to create the language model. It is difficult to create speaker-dependent language models other than in very narrow cases (e.g., contact lists), in part because such models require large amounts of text to create. Language models are usually created to be as inclusive as possible within the domains they are used. Some are specific to domains such as medical dictation (or, even more narrowly, subspecialties such as radiology) and increase their accuracy by that specificity.

The techniques in the present disclosure for acoustic models can be adapted to create categories of language models that are empirically defined rather than defined a priori by specialty (such as radiology). As with the method for acoustic models, a category number can be assigned that covers a range of individuals without the need for an individual identification.

An additional variable sometimes affecting speech recognition accuracy is the platform delivering the speech, e.g., a mobile phone versus a headset microphone attached to a PC or pad computer. Within mobile phones, for example, one might use a separate Bluetooth headset with different acoustic characteristics than the microphone in the phone. Phones vary both in the number of microphones (some use two microphones or more) and the placement of the microphones. Some use noise-cancelling software or chips that can distort the speech differently. Mobile phones can be used with the microphone near the mouth or at a distance in speakerphone mode (necessary for a video call), impacting the speech signal. Even the wireless service provider may affect the speech signal due to network transmission differences. It would be difficult to train a speech recognizer for each device and combination of device and Bluetooth headset and usage scenario, even if new devices weren't constantly being introduced. However, many of these combinations will result in similar effects on the speech. As with the discussion of acoustic and language models, the techniques in the present disclosure can be applied to create categories that can be used to improve recognition accuracy by narrowing the set of conditions without requiring explicit identification of the platform (e.g., a model of mobile phone).

While separate categories for speaker, language model, and device typically are useful individually or in combination, a single category number could represent a combination of speaker, language, and device/transmission categories, again reducing the number of categories by using the method of this document by combining similar triplets or pairs of categories.

Another advantage of clustering speakers, as opposed to single-speaker enrollment, is that it is much easier to obtain large amounts of example speech from multiple speakers rather than one speaker. The more data used to create a speaker model, the more effective the parameter estimation can be and thus the more accurate the speech recognition engine.

In general, the concept of "speech recognition" is distinguishable from the concepts of "speaker identification," "speaker authentication" or "speaker verification," which may be used, for example, in forensics or in biometric authentication for credit card processing. "Speaker identification" or "speaker authentication" or "speaker verification," tend to focus on identifying a particular speaker, with a primary objective of distinguishing that speaker from every other speaker. The objective of the methods described herein is not to identify a particular speaker, but instead to categorize speakers into groups of speakers having similar speaking characteristics, where those groups are similar from the perspective of parameters that relate to accurate speech recognition. It would be counterproductive to the objective herein if each speaker category was not applicable to many speakers. Speech recognition typically attempts to ignore differences in individual speakers to get at the content of what they are saying. In some implementations, for example, the speaker clusters discussed herein are essentially groups of individuals that are similar from a speech recognizer's "point of view" rather than what a speaker authentication system might focus on, e.g., pitch.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
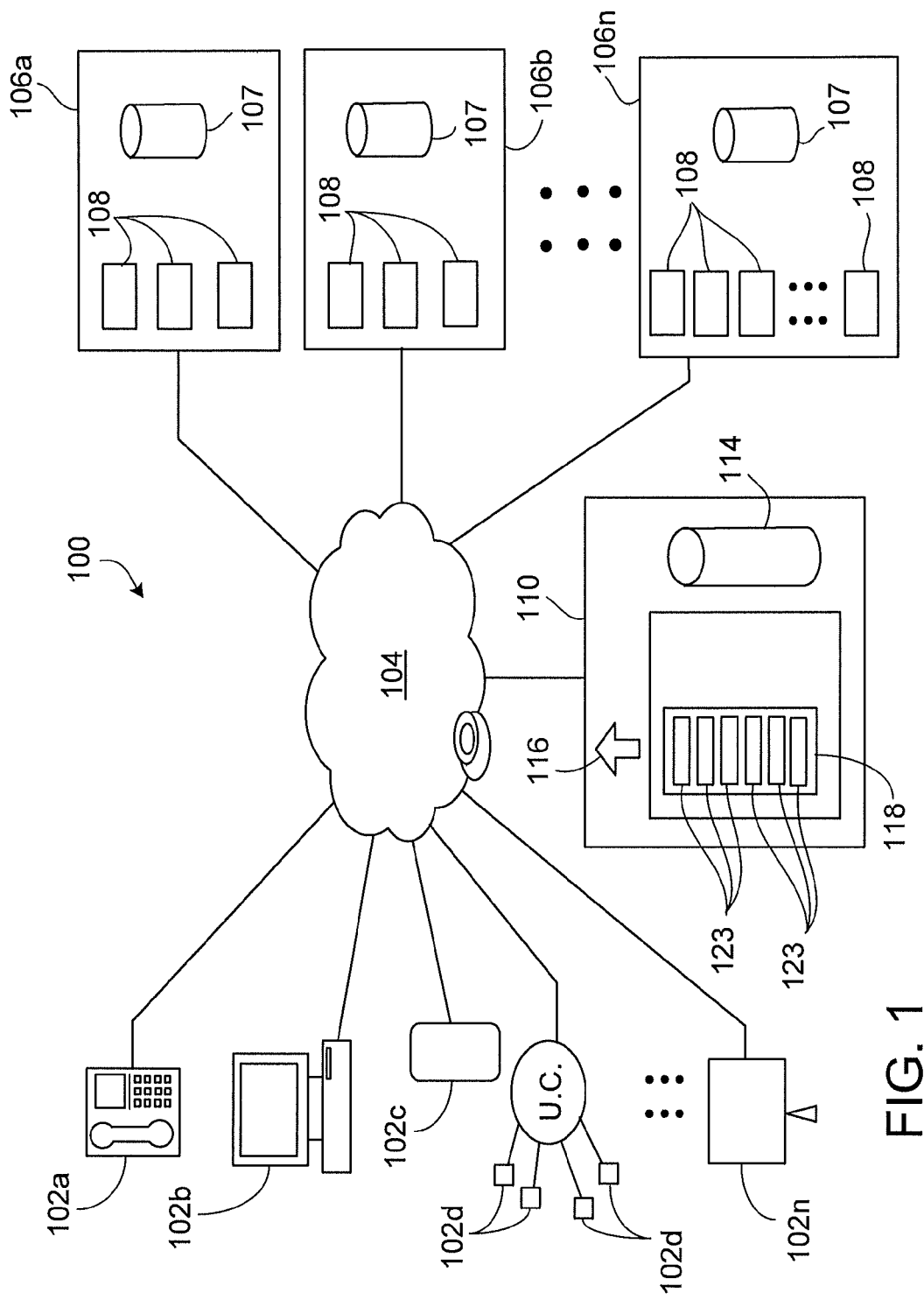
FIG. 1 is a schematic diagram of an exemplary computer system with a speech management server system.

FIG. 1 is a schematic diagram of an exemplary computer system 100.

The illustrated system 100 includes a plurality of network devices 102a, 102b, 102c, 102d . . . 102n coupled via a computer network 104 to a plurality of applications 106a, 106b . . . 106n that utilize speech recognition technology. The illustrated network devices include a landline telephone 102a, a desktop computer 102b (with a built-in or attached microphone), a mobile smartphone 102c (perhaps with an attached Bluetooth headset), a Unified Communications system that connects telephones 102d within an organization, and a video conference system 102n that includes a microphone. The applications include a first application 106a that enables users to obtain directory assistance by speaking, a second application 106b that enables users to voice search the web by speaking key words and commands, and a third application 106n that allows users to dictate an email or text message and have it transcribed as text for transmittal. For the purposes of this illustration, each service is independently provided, perhaps by different companies.

In general, users can access the applications 106a, 106b . . . 106n from any one of the illustrated network devices 102a, 102b, 102c, 102d . . . 102n and interact with the applications 106a, 106b . . . 106n at least partially by speaking into microphones that are either part of or coupled to the network devices 102a, 102b, 102c, 102d . . . 102n.

In the illustrated system 100, each application 106a, 106b . . . 106n includes multiple speech recognition engines 108 that are tuned to different speaker types or categories (i.e., with different sets of speech recognition parameters for each category) and a memory storage device 107. The memory storage device 107 typically includes one or more sets of speech recognition parameters defining the speech recognition engines and other information that facilitates the application's various operations. The speech recognition "engines" may be implemented as one software routine that uses the appropriate parameters for a given category.

In some implementations, the application speech recognition engines are implemented on servers at the same location as the application 106a, 106b . . . 106n to which they respectively correspond. Alternatively, one or more of the speech recognition engines may be remotely located relative to the application to which it corresponds.

The illustrated system 100 also includes a speech management server system 110 coupled to the network 104. The speech management server system 108 is able to communicate over the network 104 with all of the network devices 102a, 102b, 102c, 102d . . . 102n and all of the applications 106a, 106b . . . 106n. The speech management server system 110 is used by either the user or the application to obtain a speaker category identification code. It is not typically used when the user interacts with the application after obtaining a speaker category identification code. In that case, only the speaker category identification code need be made available to the application.

The illustrated speech management server system 110 includes a processing module 112, a memory storage device 114 and a transceiver 116 that enables the speech management server system 110 to communicate over the network 104. The processing module 112 includes a speech recognition module 118 with multiple speech recognition engines 123. The speech recognition engines 123 are generally operable to produce recognized versions (usually a text representation) of audio files of speech samples (e.g., audio files of speech samples from speech corpuses). Each of the speech recognition engines 123 is tuned to a different speaker type.

A single speech corpus typically includes an audio file of a speech sample and an at least approximate (if not exact) transcription of the speech sample. In a typical implementation, the speech recognition engines in the speech recognition module 118 are created prior to use of the speech management server system 110 in an analysis of a body of speech identified by speaker to obtain clusters based on similarity from a speech recognition perspective. Each cluster corresponds to a category of speaker, and a speech engine (that is, parameters driving speech recognition software) is derived for each cluster from the speech corpuses in that cluster. This analysis is done prior to deployment of the speech management server system by a separate system (not shown in FIG. 1) that is adapted to compare speech corpuses with one another to produces a quantified measure of the differences between the speech corpuses and produce information that can be used to create the speech engines 123 in the speech management server system 110.

The memory storage device 114 is adapted to store any type of information that facilitates the speech management server system's functionality.

In very general terms, the speech management server system 110 is adapted to generate speaker category identification codes that can be used by any one of the multiple applications 106a, 106b . . . 106n that are coupled to the network 104 to select an appropriate one of its tuned speech recognition engines 108 for use in connection with an interaction with a user associated with a speaker category identification code. Typically, the same speaker identification code would be associated with many different users, who all produce similar speech from a speech recognition perspective. Thus, the speech management server system 110 can, in some instances, help enhance the ability of the applications 106a, 106b . . . 106n to provide highly accurate speech recognition functionality to users accessing the applications 106a, 106b . . . 106n over the network 104 in a highly efficient and cost effective manner. Typically, the improved accuracy enhances the user's satisfaction and overall experience with the application, thereby, encouraging additional and/or more frequent interactions with the application. Further, the fact that the application speech engines are tuned to a specific category, rather than to all possible speakers, allows the use of a less complex model and thus more efficient processing.

Figure 2:
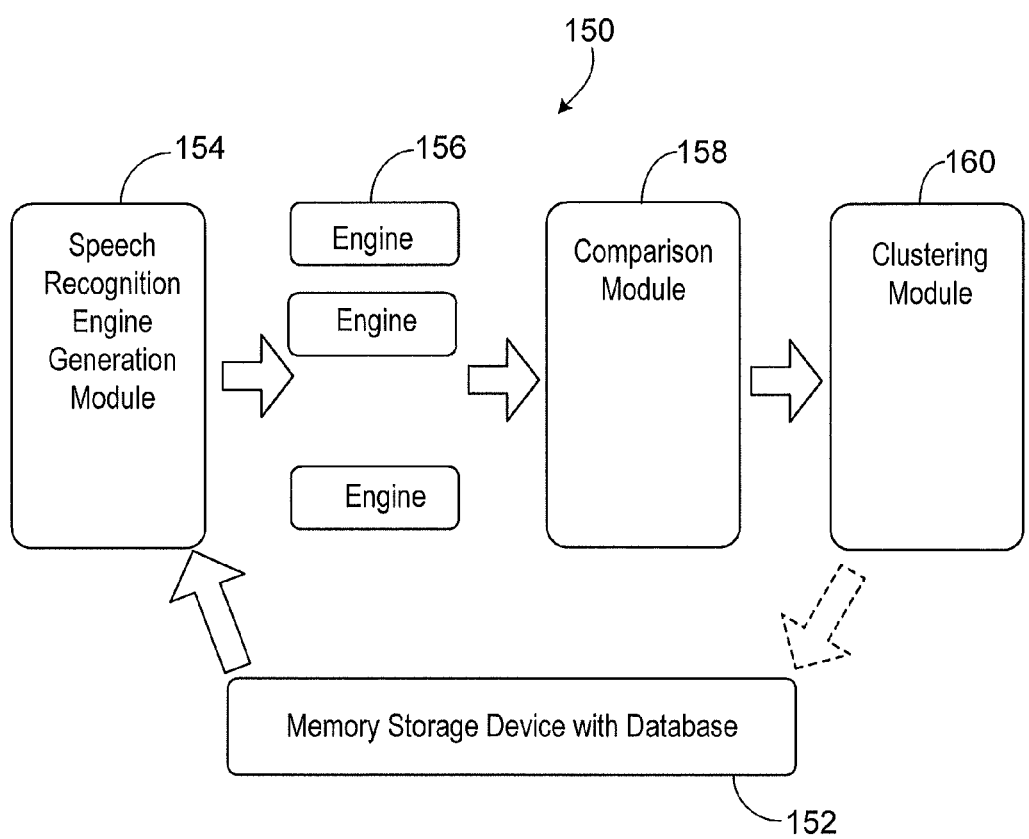
FIG. 2 is a schematic diagram of an exemplary computer-based development system for the speech management server system of FIG. 1.

FIG. 2 is a schematic diagram of a computer-based development system 150. In a typical implementation, the illustrated development system produces information that can used to build the speech recognition engines 123 of the speech management server system 110 in FIG. 1.

The illustrated development system 150 includes a memory storage device 152 that includes a database of speech corpuses, a speech recognition engine generation module 154, one or more speech recognition engines 156 (produced with the speech recognition engine generation module 154), a comparison module 158 and a clustering module 160.

In general, the database in the memory storage device 152 includes a plurality of speech corpuses, each of which having an audio file of a speech sample from a speaker and an approximate (or exact) transcription of the audio file. In general, each speech sample should have enough data to enable a speech recognition engine to be built based on that data.

The speech recognition engine generation module 154 is adapted to generate from a single speech corpus (or a group of speech corpuses) parameters that can be used to create one or more speech recognition engines based on the single speech corpus (or group of speech corpuses).

The one or more speech recognition engines 156 are engines that were created with the speech recognition engine generation module 154. The one or more speech recognition modules 156 are generally operable to produce recognized versions of the audio files of the speech samples.

The comparison module 156 is adapted to calculate distances (e.g., edit distances) between speech corpuses based on recognized versions and/or transcriptions of the speech corpuses. These distances generally represent how similar two speech corpuses are to one another in terms of their suitability to be represented by a single speech engine, that is, their similarity from a speech recognition point of view.

The clustering module 158 is adapted to organize the speech corpuses into clusters based on the calculated distances.

The processes performed by the various modules in FIG. 2 can be repeated in an iterative fashion.

Figure 3:
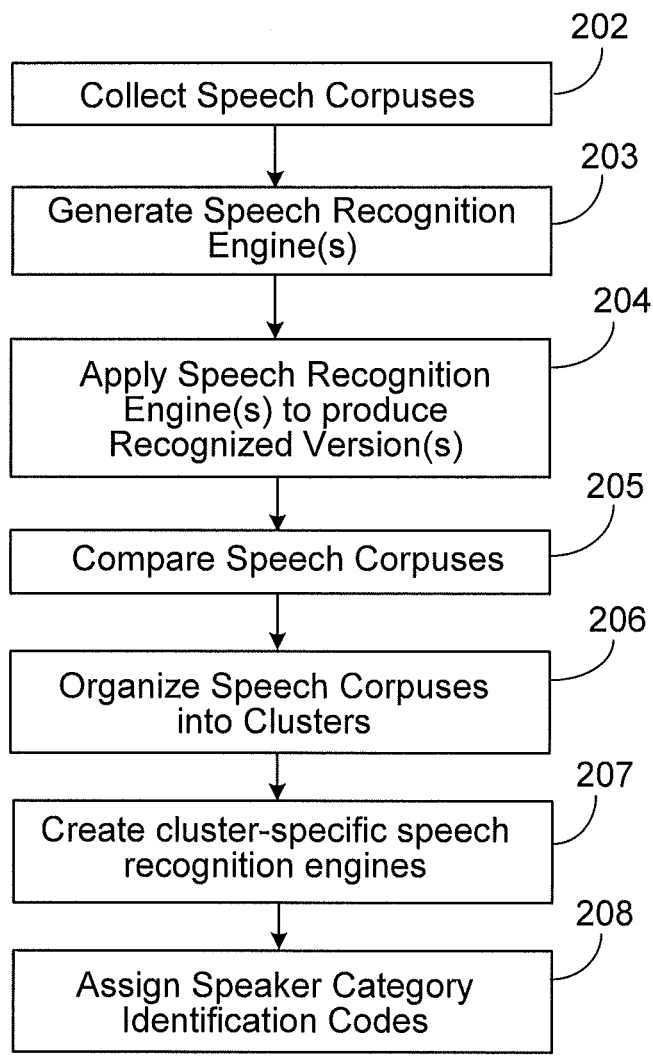
FIG. 3 is a flowchart showing one implementation of a method by which a speech management server system creates a set of speaker category identification codes.

FIG. 3 is a flowchart showing one implementation of a method by which the development system 150 initially creates a set of speaker category identification codes. As discussed herein in detail, sometime after the speaker category identification codes are created, any one of a plurality of applications 106a, 106b . . . 106n will be able to use the speaker category identification codes to decide which of a plurality of tuned speech recognition engines 108 will be most suitable to use in interacting with various different users, respectively.

According to the illustrated method, the development system 150 that does the analysis creating the data used by the Speech Management Server system 110 uses a group of speech corpuses which include both speech data and an approximate text transcription and which have been collected for this purpose and are generally large enough for each speaker to create a reliable speech recognition engine for that speaker (at step 202), compares the speech corpuses to identify which speech corpuses are similar to one another from a speech recognition perspective (at step 204), organizes the speech corpuses into clusters (at step 206), creates speech recognition engines (at step 207), and assigns a unique speaker category identification code to each of the clusters and the corresponding speech recognition engine thus created (at step 208). More particularly, according to the illustrated method, the development system employs a group of speech corpuses (at step 202). The group of speech corpuses can be collected in a variety of ways and from one or more sources. In some implementations, the group of corpuses is specifically collected for the purposes discussed herein. In some instances, all the corpuses in the group have the same speech content, but this is not a requirement. It is a typical requirement that the speech corpus for each speaker be large enough to create a reasonably reliable speech recognition engine. The collected speech corpuses may be stored in the memory storage device 152 or in one or more remotely located memory storage devices that are accessible to the development system 150. The speech corpuses that are collected (at step 202) may or may not include (but typically do not include) speech samples from people who will subsequently be accessing one of the applications using one of the speaker category identification codes assigned by the speech management server system 110. Instead, the speech corpuses that are collected (at step 202) typically are from a random selection of people that are intended to be generally representative of the range of speakers who will be using the deployed system later.

Once collected (or as they are being collected), the speech recognition engine generation module 154 generates speech recognition engines based on one or more of the speech corpuses (at step 203), the speech recognition engines 156 produce recognized versions of the speech corpuses (at step 204), the comparison module 158 compares (at step 205) the speech corpuses with one another to produce quantified measures of the differences (e.g., the distances) between pairs of speech corpuses by a method to be described. After the comparison module makes comparisons (at step 205) (or as the comparisons are happening), the clustering module 160 organizes the speech corpuses into clusters (at step 206) based on, for example, the distances between the various speech corpuses as calculated by the comparison module 158. There are a variety of ways that the comparison module 158 can calculate distances between speech corpuses and that the clustering module 160 can organize the speech corpuses into clusters based on the calculated distances, ways that will be discussed later. The result of this analysis may be placed, for example, in the speech recognition engine module 118 in FIG. 1 or used to create the speech recognition engines in module 118.

Figure 4:
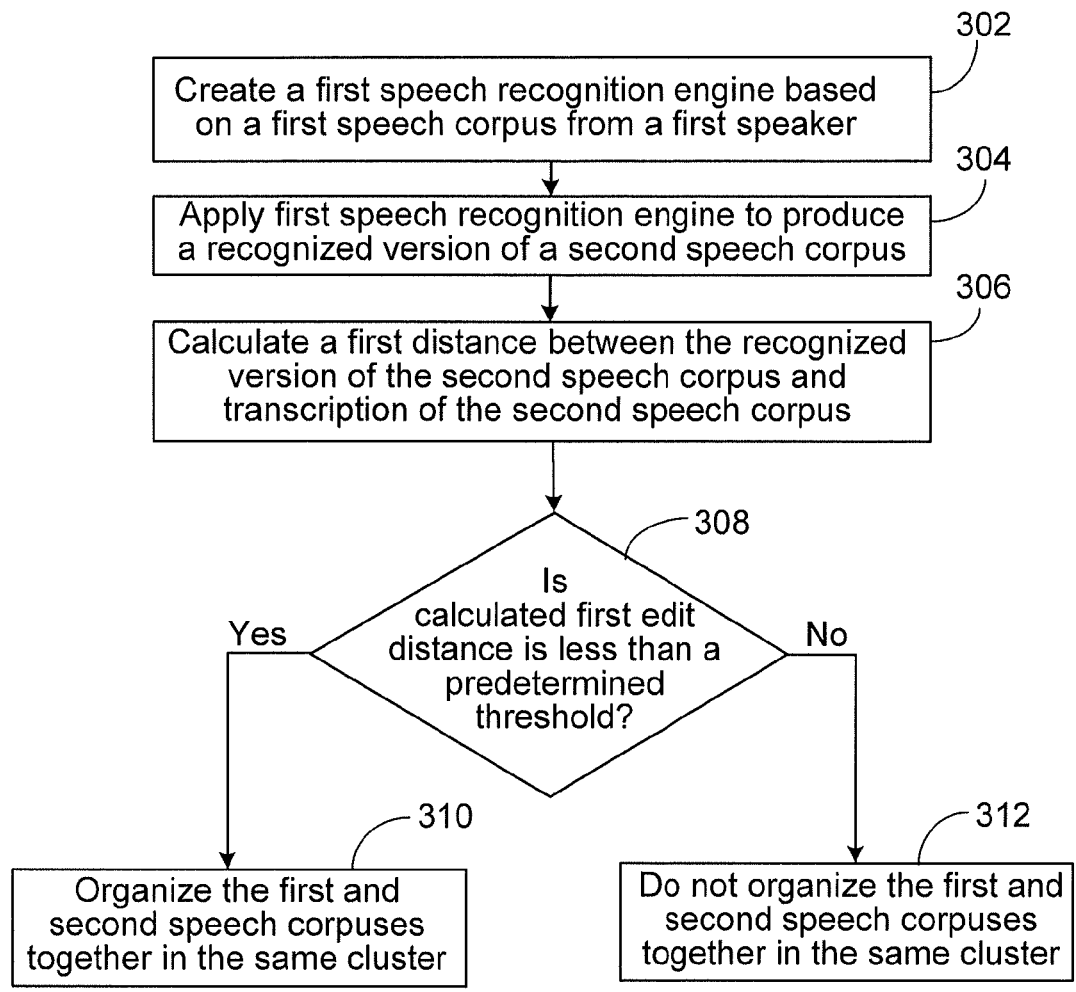
FIG. 4 is a flowchart of a method showing one implementation of a comparison module calculating a distance between a pair of speech corpuses in a clustering module organizing the speech corpuses into clusters.

FIG. 4 is a flowchart of a method showing one implementation of how the speech recognition engine generation module 154 and the comparison module 158 work together to calculate a distance between a pair of speech corpuses and how the clustering module 160 organizes the speech corpuses into clusters based on the calculated distances.

According to the illustrated flowchart, the speech recognition engine generation module 154 creates a first speech recognition engine based on a first speech corpus from a first speaker (at step 302). The first speech recognition engine is then applied to produce a recognized version of a second speech corpus (at step 304). The second speech corpus is different than the first speech corpus. The comparison module 158 then calculates a first distance [e.g., an edit (text mismatch) distance or an error rate] between the recognized version of the second speech corpus and an at least approximate (if not exact) transcription of the second speech corpus (at step 306). This distance measures how well a recognition engine developed for one speaker can recognize another speaker, a direct measure of the similarity of the speakers from a speech recognition point of view. That is, a low error rate implies the speakers have similar characteristics for speech recognition purposes.

The clustering module 160 then considers (at step 308) whether the calculated first edit distance is less a predetermined threshold. If the clustering module determines (at step 308) that the calculated first edit distance is less than the predetermined threshold, then the clustering module organizes the first and second speech corpuses together in the same cluster (at step 310). If the clustering module 160 determines, on the other hand, that the first edit distance is greater than the predetermined threshold, then the clustering module 160 does not organize the first and second speech corpuses together in the same cluster (at step 312). The predetermined threshold in one implementation is determined by examining all the pairwise edit distances between clusters and choosing one which includes X % of the distances. There are many alternative ways of performing this step, for example, choosing first the two closest corpuses and making them one cluster, and continuing this process until there are no more corpuses to add to existing clusters. *Clustering*, by Rui Xu and Don Wunsch, Wiley-IEEE Press, (2008) is incorporated by reference herein and discusses a variety of clustering techniques that may be implemented, for example, by the clustering module 160.

In a typical implementation, the speech recognition engine generation module 154, the comparison module 158 and the clustering module 160 repeat these steps to process and organize an entire group of speech corpuses into clusters. This is a simple example of an approach that clusters corpuses using only a distance measure and not requiring that the corpuses be represented as points in an N-dimensional Euclidean space, as is often assumed by clustering algorithms.

Figure 5:
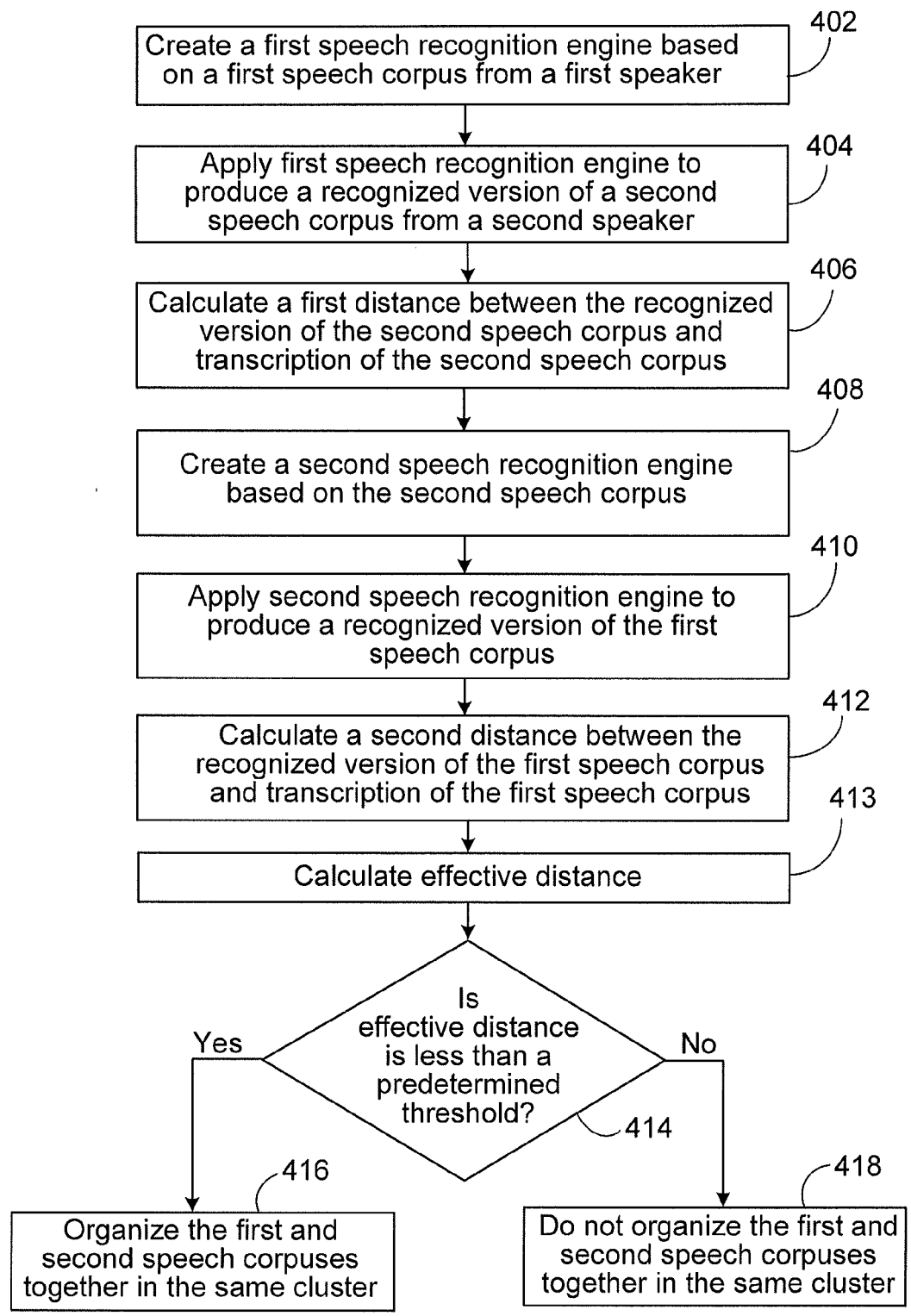
FIG. 5 is a flowchart of a method showing another implementation of a comparison module calculating a distance between a pair of speech corpuses in a clustering module organizing the speech corpuses into clusters.

FIG. 5 is a flowchart of a method showing another implementation of how the speech recognition engine generation module 154 and the comparison module 158 work together to calculate a distance between a pair of speech corpuses and how the clustering module 160 organizes the speech corpuses into clusters based on the calculated distance.

According to the illustrated flowchart, the speech recognition engine generation module 154 creates a first speech recognition engine based on a first speech corpus from a first speaker (at step 402). The first speech recognition engine is then applied to produce a recognized version of a second speech corpus (at step 404). The second speech corpus is different than the first speech corpus. The comparison module 158 then calculates a first distance (e.g., an edit distance or an error rate) between the recognized version of the second speech corpus and an at least approximate (if not exact) transcription of the second speech corpus (at step 406).

The speech recognition engine generation module 154 then creates a second speech recognition engine based on the second speech corpus (at step 408). The second speech recognition engine is then applied to produce a recognized version of the first speech corpus (at step 410). The comparison module 158 then calculates a second distance (e.g., an edit distance or an error rate) between the recognized version of the first speech corpus and an at least approximate (if not exact) transcription of the first speech corpus (at step 412).

The comparison module then calculates (at step 413) an effective distance between the first and second speech corpuses based on the calculated first and second edit distances. There are a variety of ways that the effective distance can be calculated. For example, the effective distance can be an average of the first and second edit distances; it can be the higher of the two, the lower of the two, etc.

One possible drawback of using an average of the first and second edit distances as the effective distance is that the higher error rate of the two might be an artifact of one corpus being smaller than the other where the engine parameters have been developed for the smaller corpus. In many cases, the engine that gives the lowest error rate on the other corpus may provide more meaningful data. Since a low error rate (distance) in either of the two thus reflects that one covers the other well, a preferred distance (or error measure) may be $d(i,j)=\text{Min}[E(j,i),E(i,j)]$, the lower error rate of the two. In this case, no errors in one case would produce a distance of zero, a desirable and intuitively correct result.

The clustering module 160 then considers (at step 414) whether the effective distance is less than a predetermined threshold. If the clustering module 160 determines (at step 414) that the calculated first edit distance is less than the predetermined threshold, then the clustering module 160 organizes the first and second speech corpuses together in the same cluster (at step 416). If the clustering module 160 determines, on the other hand, that the first edit distance is greater than the predetermined threshold, then the clustering module 160 does not organize the first and second speech corpuses together in the same cluster (at step 418).

In a typical implementation, the speech recognition engine generation module 154, the comparison module 158 and the clustering module repeat these steps to process and organize an entire group of speech corpuses into clusters.

Referring again to FIG. 3, the development system creates (or provides information to create) multiple speech recognition engines at the speech management server system 110 (at step 207), with one such engine created per cluster. These engines are then used in the deployed system. In general, each speech recognition engine 123 is developed based on characteristics of the speech corpuses that have been (or are being) organized into the corresponding cluster. A variety or techniques can be utilized to create the speech recognition engines. For example, the speech recognition engines can be created by applying Hidden Markov Modeling. *Spoken Language Processing: A Guide to Theory, Algorithm and System Development*, by Xuedong Huang, Alex Acero, and Hsiao-Wuen Hon, Prentice-Hall (2001) is incorporated by reference herein and discloses techniques for creating a speech recognition engines based on speech data. Alternatively, there are publicly available speech recognition toolkits that can be used to create the speech recognition engines. Examples include the Carnegie Mellon University CMU Sphinx open source toolkit for speech recognition. See, e.g., http://cmusphinx.source.forge.net/.

Typically, the speech recognition engines 123 in the speech management server system 110 are created after the final clusters have been organized. During the cluster development process, however, the speech recognition engines 156 at the development system may be recomputed as clusters are combined, in order to repeat the distance measuring process iteratively with larger clusters.

Once the clusters have been organized, the clustering module 160 assigns a speaker category identification code to each cluster (at step 208). Each speaker category identification code is a unique code. The code can take any form and include, for example, alphanumeric and/or symbolic characters. For example, in one implementation, the speaker category identification codes are integers where the format of the integers indicate a series of clustering operations that reflect the relationship of the clusters (e.g., 111, 112, 121, 122, 211, 212, 221, 222, etc., where clusters 111 and 112 were created by splitting cluster 11). This form of code allows a speech application developer to combine clusters into larger clusters if they have a shortage of speech data to create an engine from one cluster. Since all of the speech corpuses in a given cluster typically are similar from a speech recognition perspective, the speaker category identification codes assigned to the clusters essentially represent speaker types that correspond to the speech corpuses in the corresponding clusters.

In one variation, the development system may create the final speech recognition engines for each final cluster (each identification code) and provide those to application developers to apply to incoming speech of a speaker identified with that code.

The clustered speech corpuses and corresponding speaker category identification codes may be stored in the memory storage device 114 or in one or more remotely-located memory storage devices. The initial set-up steps (i.e., steps 202 through 208 in FIG. 3, discussed above) typically are conducted on behalf of the speech management server system 110 well before any one of the users or applications interact with speech management server system 110 to obtain a speaker category identification code for a particular user or other groups of speech corpuses.

In a typical implementation, after the speech corpuses have been organized into clusters, the speaker category identification codes have been assigned and the speech recognition engines 123 in the speech management server system 110 have been built, one or more of the applications 106a, 106b . . . 106n is able to access the speech management server 110 to learn speaker category identification codes and information that enables each application to build its own speech recognition engines that are tuned to each of the speaker types that correspond to the speaker category identification codes.

Figure 6:
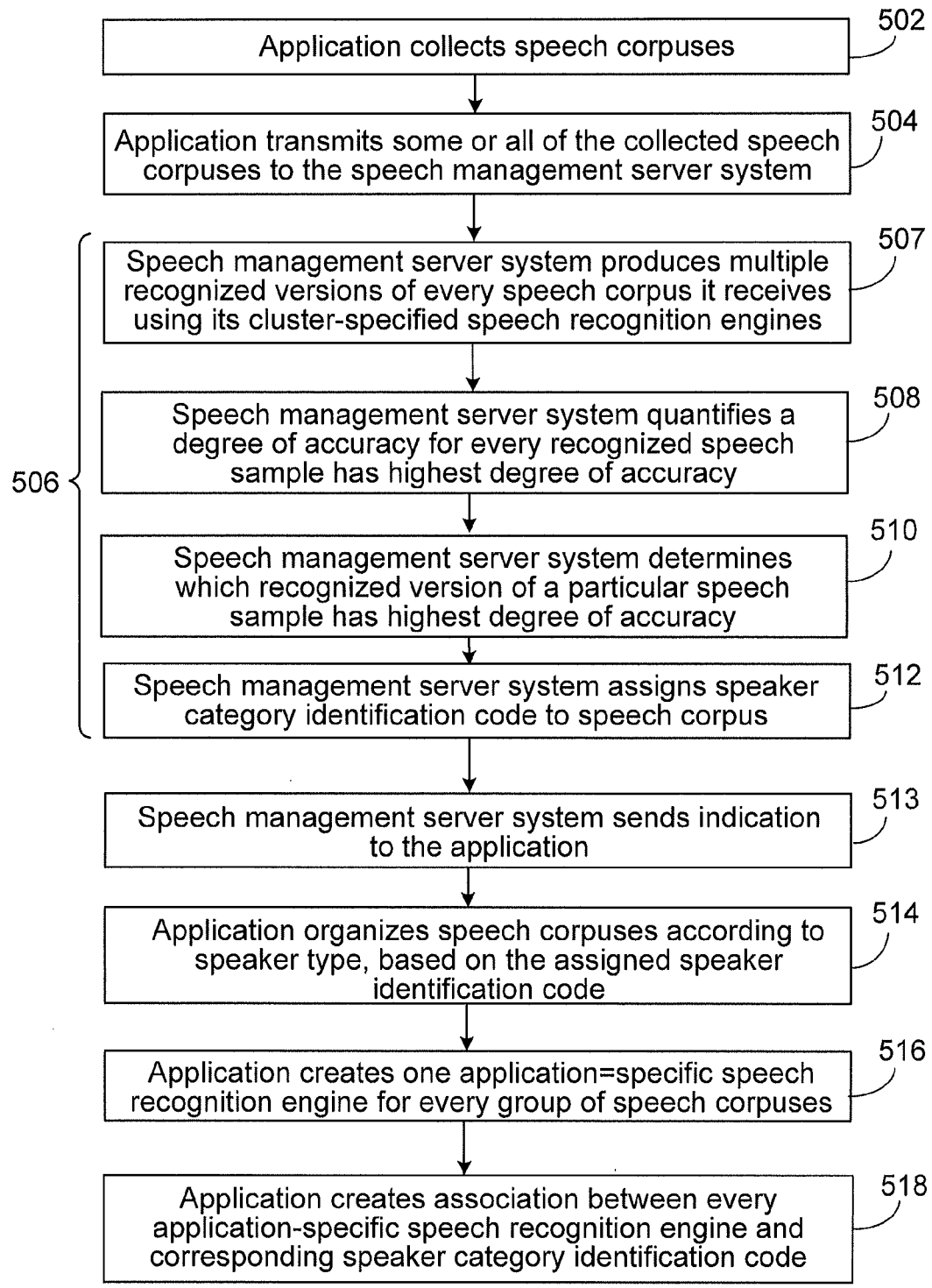
FIG. 6 is a flowchart of a method showing one implementation of an application obtaining information to build application-specific speech recognition engines that are tuned to particular speaker types and building the engines.

FIG. 6 is a flowchart of a method showing one implementation of application (e.g., application 106a): (1) accessing the speech management server 110 to obtain information that enables the application to build its own application-specific speech recognition engines that are tuned to each speaker type that corresponds to one of the speaker category identification codes, and (2) building the application-specific speech recognition engines using the information it receives.

According to the illustrated method, the application 106a collects a plurality of speech corpuses (at step 502). Typically, the application 106a stores the collected speech corpuses in a local memory storage device 107 that is associated with the application 106a. However, the speech corpuses can be stored at any location that is accessible in any way by the application. There are a variety of sources for the speech corpuses that the application collects. As one example, the collected speech corpuses may have come from previous interactions between the application 106a and one or more users. The speech corpuses may also have been collected specifically for development purposes.

The application 106a (at step 504) transmits some or all of the collected speech corpuses to the speech management server system 110 typically with a request that the speech management server system 110 provide speaker identification codes for each of the transmitted speech corpuses.

According to the illustrated implementation, the speech management server system (at step 506) assigns one of the previously-established speaker identification codes to every speech corpus it receives from the application 106a. There are a variety of ways that the speech management server system 110 can accomplish this. In one example, the speech management server system 110 produces (at step 507) multiple recognized versions of every speech corpus it receives using its speech recognition engines 123. Thus, if the speech management server system 110 has eight different speech recognition engines 123 (e.g., one for eight different speaker category identification codes), then the speech recognition module 118 (which includes all of the engines 123) would produce eight different recognized versions of every speech sample. Since the speech recognition engines are tuned to different speaker types, in a typical example, the recognized versions produced by the different speech recognition modules would have differing degrees of accuracy.

According to the illustrated implementation, the speech recognition module 118 quantifies (at step 508) a degree of accuracy for every recognized version of a speech sample produced by the speech recognition module 118. There are a variety of ways that the degree of accuracy can be quantified. In one example, the degree of accuracy can be quantified as a distance (e.g., an edit distance) between the recognized version of the speech sample and a transcription of the speech sample (e.g., the transcription that is tagged to the speech corpus itself).

Then, the speech management server system 110 determines (at step 510) which of the recognized versions of a particular speech sample has the highest degree of accuracy. The speech management server system 110 then selects the particular speaker category identification code that corresponds to the speech recognition engine that produced the most accurate recognized version of the speech sample. The speech management server system 110 assigns (at step 511) that code to the speech corpus (that includes the particular speech sample).

This process can be repeated by the speech management server system 110 until all of the speech corpuses the speech management server system 110 received from the application have been assigned one of the speaker category identification codes.

According to the illustrated implementation, the speech management server system 110 sends an indication to the application 106a (at step 513) of which speaker category identification code has been assigned to the respective speech corpuses. This transmission can be done, for example, as each of the speaker category identification codes is assigned, after a group of such assignments are made, or after all of the speech corpuses have been assigned codes.

In the illustrated method, after the application 106a receives the indication of which speaker identification code has been assigned to each of its speech corpuses, the application developer (or a provider of speech engines for the application developer) organizes the speech corpuses (at step 514) according to speaker type, based on the assigned speaker identification codes. The application 106a then creates (at step 516) one application-specific speech recognition engine (e.g., 108) for every group of speech corpuses. The application-specific recognition engines 108 are created based on the characteristics of the speech corpuses in the corresponding group. Thus, every application-specific speech recognition engine 108 in a particular application ends up being tuned to a different speaker-type.

We use the term "application-specific" in that the application developer is presumed to submit speech corpuses relevant to its application. If so, the speech engines are tuned both to the speaker category and the application, so that the results for every application developer are likely to be different. In a more general case, a speech engine developer or the developer of the clusters can create more general engines that are specific to speaker categories, but not necessarily application-specific.

The application 106a creates an association (at step 518) between every application-specific speech recognition engine 108 it creates and the corresponding speaker category identification code so that the application 106a can use a selected one of its application-specific speech recognition engines in its interactions with a user it knows is associated with a particular one of the speaker category identification codes.

In a typical implementation, the speech management server system 110 is adapted to assign speaker category identification codes to users accessing (or who want to access) one or more of the applications 106a, 106b . . . 106n.

Figure 7:
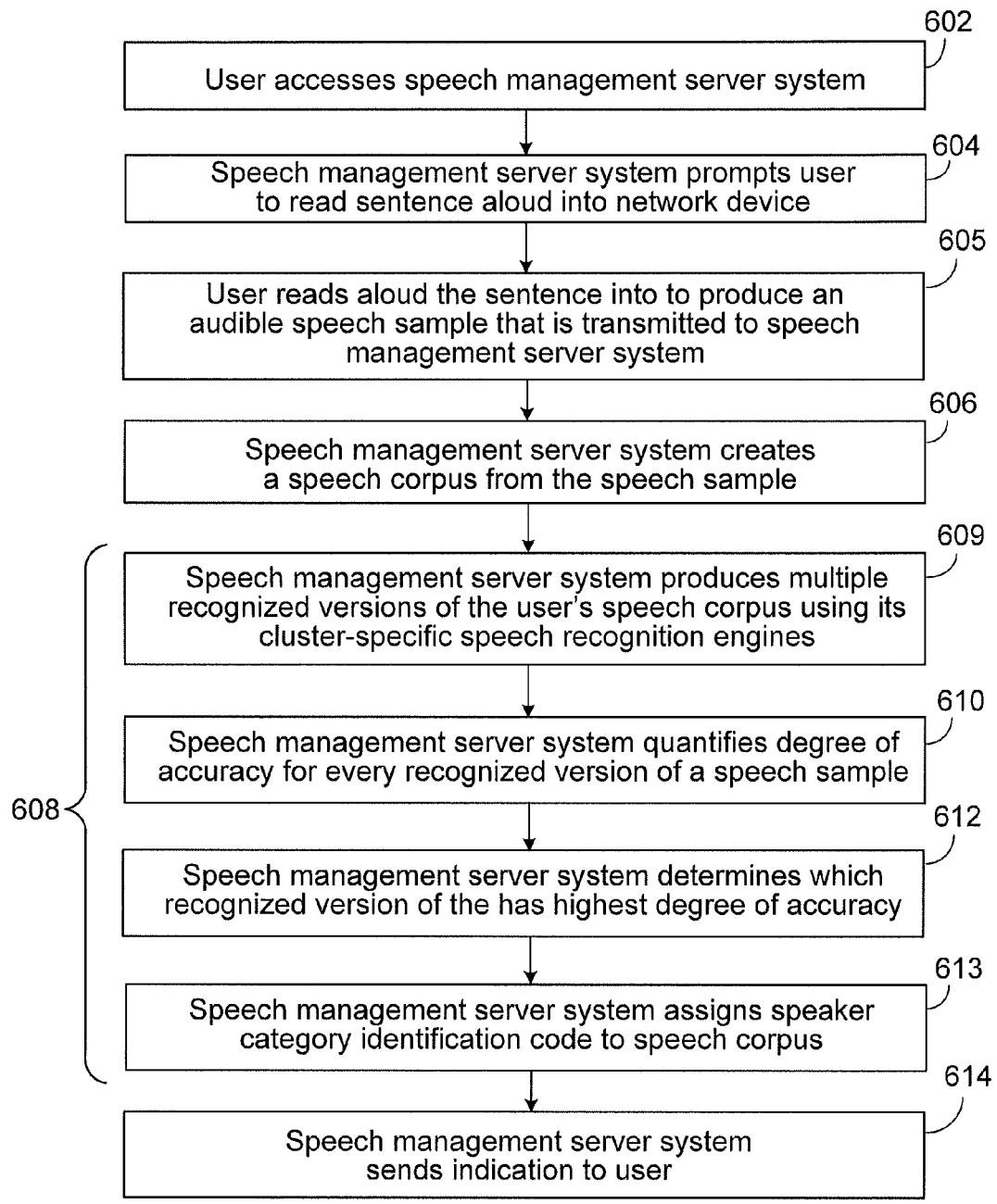
FIG. 7 is a flowchart of a method showing one implementation a speech management server system interacting with a user at a network device.

FIG. 7 is a flowchart of a method showing one implementation of the speech management server system 110 interacting with a user at a network device (e.g., mobile smartphone 102c) to assign the user a speaker category identification codes that can be utilized to facilitate interactions between the user and any one of multiple applications 106a, 106b . . . 106n.

According to the illustrated implementation, the user accesses the speech management server system 110 (at step 602), for example, by calling into a phone number from the mobile smartphone 102c. There are other ways to access the speech management server system 110 as well, including, for example, logging into a website.

In the illustrated implementation, the speech management server system 110 sends a text message to the mobile smartphone 102c (at step 604) with a sentence for the user to read aloud and a prompt to the user to read the text message aloud into the mobile smartphone 102c. The sentence can be virtually any sentence or collection of words or sounds that would provide, for example, information that enables the speech management server 110 to assess relevant characteristics of the user's speech from a speech recognition perspective.

The user reads aloud the sentence from the text message into the mobile smartphone 102c to produce an audible speech sample (at step 605), which is transmitted over the network 104 to the speech management server system. The user may be asked to repeat this process several times in order to provide sufficient speech data to assign a speaker category reliably.

The speech management server system creates a speech corpus (at step 606) from the speech sample it receives. In a typical implementation, the speech corpus for that user will include an audio file of the user's speech sample and the text that was messaged to the user to read.

According to the illustrated implementation, the speech management server system (at 608) assigns one of the previously-established speaker identification codes to the user's speech corpus. There are a variety of ways that the speech management server system 110 can accomplish this. In one example, the speech management server system 110 produces multiple recognized versions of the user's speech corpus (at step 609) using its speech recognition engines 123. Thus, if the speech management server system 110 has eight different speech recognition engines 123 (e.g., one for eight different speaker category identification codes), then the speech recognition module 118 (which includes all of the engines 123) would produce eight different recognized versions of the user's speech sample. Since the speech recognition engines are tuned to different speaker types, in a typical example, the recognized version produced by the different speech recognition modules would have differing degrees of accuracy.

According to the illustrated implementation, the speech management server system 110 quantifies (at step 610) a degree of accuracy for every recognized version of a speech sample produced by the speech recognition module 118. There are a variety of ways that the degree of accuracy can be quantified. In one example, the degree of accuracy can be quantified as a distance (e.g., an edit distance) between the recognized version of the speech sample and a transcription of the speech sample (e.g., the text that was messaged to the user's smartphone 102c).

Then, the speech management server system 110 determines (at step 612) which of the recognized versions of the user's speech sample has the highest degree of accuracy.

The speech management server system 110 then assigns (at step 613) the speech corpus (that includes the particular speech sample) the particular speaker category identification code that corresponds to the speech recognition engine 123 that produced the most accurate recognized version of the speech sample.

According to the illustrated implementation, the speech management server system 110 sends an indication to the user (at step 614) of the speaker category identification code that has been assigned to the user. This transmission can be done in a number of ways (e.g., via text to the smartphone 102c, via automated phone call, via email, via regular mail), etc.).

In an alternative implementation, a user can be assigned one of the speaker category identification codes without accessing the speech management server system 110 directly. In those instances, for example, the user may interact with one of the applications (e.g., 106a), which interacts with the speech management server system 110 on behalf of the user.

Once the user knows his or her speaker category identification code, the user can provide that code to any one of multiple applications 106a, 106b . . . 106n coupled to the network to enable that application to use the most accurate of its application-specific speech recognition engines 108 for the speaker type that corresponds to the user's code.

Figure 8:
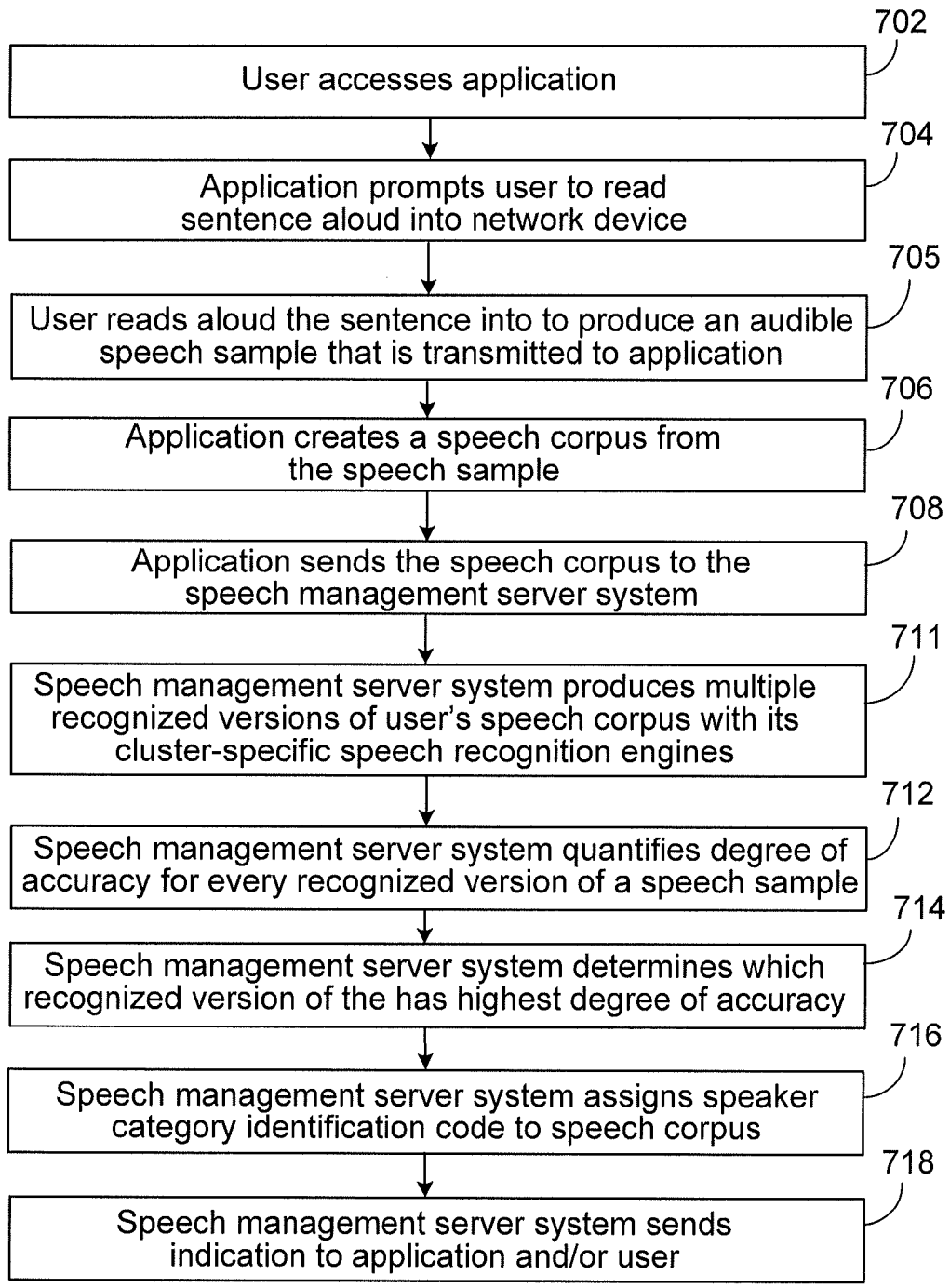
FIG. 8 is a flowchart of a method showing one implementation of a user interacting with an application and the application interacting with a speech management server system on behalf of the user.

FIG. 8 is a flowchart of a method showing one implementation of a user interacting with an application and the application interacting with the speech management server system 110 on behalf of the user to have a speaker category identification code assigned to the user.

According to the illustrated implementation, the user accesses the application 106a (at step 702), for example, by calling into a phone number from the mobile smartphone 102c. There are other ways that the user can access an application including, for example, by logging into a website from a computer.

In the illustrated implementation, the application 106a sends a text message to the mobile smartphone 102c (at step 704) with a prompt to the user to read the text message into the mobile smartphone 102c.

In the illustrated implementation, the application 106a sends a text message to the mobile smartphone 102c (at step 704) with a sentence for the user to read aloud and a prompt to the user to read the text message aloud into the mobile smartphone 102c. The sentence can be virtually any sentence or collection of words or sounds that would provide, for example, information that enables the speech management server system 110 to assess relevant characteristics of the user's speech from a speech recognition perspective.

The user then reads aloud the sentence (at step 705).

The application 106a creates a speech corpus (at step 706) from the speech sample it receives. In a typical implementation, the speech corpus for that user will include an audio file of the user's speech sample and the text that was messaged to the user to read.

The application then sends the speech corpus (at step 708) to the speech management server system 110 for processing.

According to the illustrated implementation, the speech management server system (at step 710) assigns one of the previously-established speaker identification codes to the user's speech corpus. There are a variety of ways that the speech management server system 110 can accomplish this. In one example, the speech management server system 110 produces multiple recognized versions of the user's speech corpus (at step 711) using its speech recognition engines 123. Since the speech recognition engines are tuned to different speaker types, in a typical example, the recognized version produced by the different speech recognition modules would have differing degrees of accuracy.

According to the illustrated implementation, the speech management server system 110 quantifies (at step 712) a degree of accuracy for every recognized version of the user's speech sample produced by the speech recognition module 118. There are a variety of ways that the degree of accuracy can be quantified. In one example, the degree of accuracy can be quantified as a distance (e.g., an edit distance) between the recognized version of the speech sample and a transcription of the speech sample (e.g., the text of the sentence that was messaged to the user's smartphone 102c).

Then, the speech management server system 110 determines (at step 714) which of the recognized versions of the user's speech sample has the highest degree of accuracy.

The speech management server system 110 then assigns (at step 716) the speech corpus (that includes the particular speech sample) the particular speaker category identification code that corresponds to the speech recognition engine 123 that produced the most accurate recognized version of the speech sample.

According to the illustrated implementation, the speech management server system 110 sends an indication to the application 106a and/or the user (at step 718) of the speaker category identification code that has been assigned to the user. This transmission can be done in a number of ways (e.g., via text to the smartphone 102c, via automated phone call, via email, via regular mail), etc.).

In a typical implementation, the application 106a then uses the speaker category identification code for that user to determine which one of its application-specific speech recognition engines 108 it should use in its interactions with that user to produce the most accurate, tuned speech recognition.

There are a variety of clustering techniques that the development system can apply when initially creating the clusters of speech corpuses. Some of these are discussed below.

For example, once the distances (e.g., edit distances) between speech corpuses have been calculated, the distances can be converted to "features" (i.e., axes of a Euclidean space). This can be done, for example, as follows:

1. Call a first dimension of the space being constructed $x_1$. Take any two corpuses (call them 1 and 2) and place them on the $x_1$ axis with the calculated distance between them d(1,2).
2. Take another corpus (call it 3) and measure d(1,3) and d(2,3). Add axis $x_2$ and place point 3 so that it is the calculated distances from points 1 and 2. See FIG. 8.
3. Continue this process, adding one dimension at a time to preserve the distances. This will result in a space with N−1 dimensions if there are N corpuses.
4. Optionally, condense the space to preserve distances relatively well using statistical techniques such as "principal components" analysis. This may give a lower-dimensional representation to which it is easy to apply cluster analysis.

This technique may be implemented, for example, by developers that are familiar with cluster analysis tools.

While features other than the distances (e.g., edit distances) created by the processes disclosed herein could be used while clustering in conjunction with another speech recognition closeness measure (such as average speaking rate), one approach is to use speech recognition features alone. This can, in some instances, be beneficial because a measurement that focuses on recognition uses several criteria implicitly all at once that are specifically related to recognition accuracy, while subjectively chosen variables may include many features that speech recognition is designed to ignore and leave out others that are relevant.

Another clustering approach is hierarchical in nature. This approach does not generally require that a Euclidean space be created. Instead, it uses the distances between points (corpuses for individuals or groups) directly. In one embodiment, the process includes forming a hierarchal decision tree (see, e.g., FIG. 9) as follows:

1. Take the two most distant points, $p_K$ and $p_L$, i.e., $d(K,L) \geq d(i,j)$ for all $i,j \neq K,L$. If there is a tie, choose arbitrarily.
2. Create two clusters K and L, one being all the sample points closest to the point K and the other being all the samples points closest to the point L. That is, if $d(i,K) < d(i,L)$, i is placed in K and, if not, in L. (Ties can be resolved by putting the point in the smallest cluster created so far.) In some cases, one of points chosen may be too much of an outlier, as reflected by a large imbalance in the number of samples in each cluster created by the default algorithm, and we may wish to modify the starting point to one closer in, for example, by choosing the second farthest point to the other extreme point. This can be repeated until the size of the smallest cluster exceeds a minimum, e.g., 20% of the samples.
3. For each of the clusters created, create speech recognition parameters and a speech recognition engine using all the corpuses in the cluster, treating each cluster as one corpus. Re-cluster the individual corpuses into two new groups by placing them the group corresponding to the recognizer that is most accurate when applied to the corpus. In general, although it is likely that a corpus will be placed in the group corresponding to the recognizer in which it contributed data to its creation, there is no guarantee that this is the case, so this process can be iterated until a minimum number (e.g., 1%) of the corpuses change clusters, up to a fixed number of times. This creates two clusters corresponding to the final two speech engines created.
4. For each of the current set of clusters, repeat the process in 1-3, creating a decision tree such as that in FIG. 3. Stop when a cluster has less than $K_{min}$ samples in it, where $K_{min}$ is a number that the designer considers a minimum for statistical reliability.

The decision tree can classify any new corpus by evaluating recognition accuracy with the recognizer engines created by this process at each node, passing the corpus in the direction of greatest accuracy. The resulting terminal nodes of the tree define clusters of similar speakers. The final decision tree has defined clusters based on speech recognition accuracy measurements alone without the need to define a classical Cartesian space defined by axes and corresponding variables. The "name" of the final node (a three-digit number in FIG. 9) provides an identification of a type of speaker that differs from other types of speakers not in the cluster. A recognizer tuned to such a cluster should be more accurate for speakers in that cluster and could have lower processing requirements because fewer parameters would be required since there is less variability in the cluster.

Figure 9:
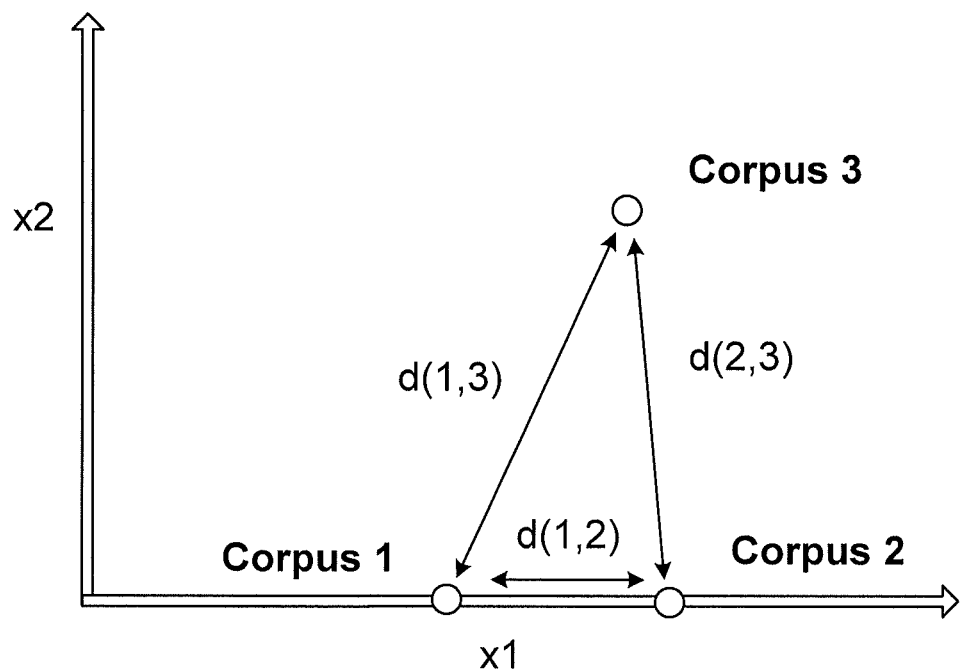
FIG. 9 is a graphical representation of a Euclidian space that can be used to facilitate clustering similar speech corpuses.
Figure 10:
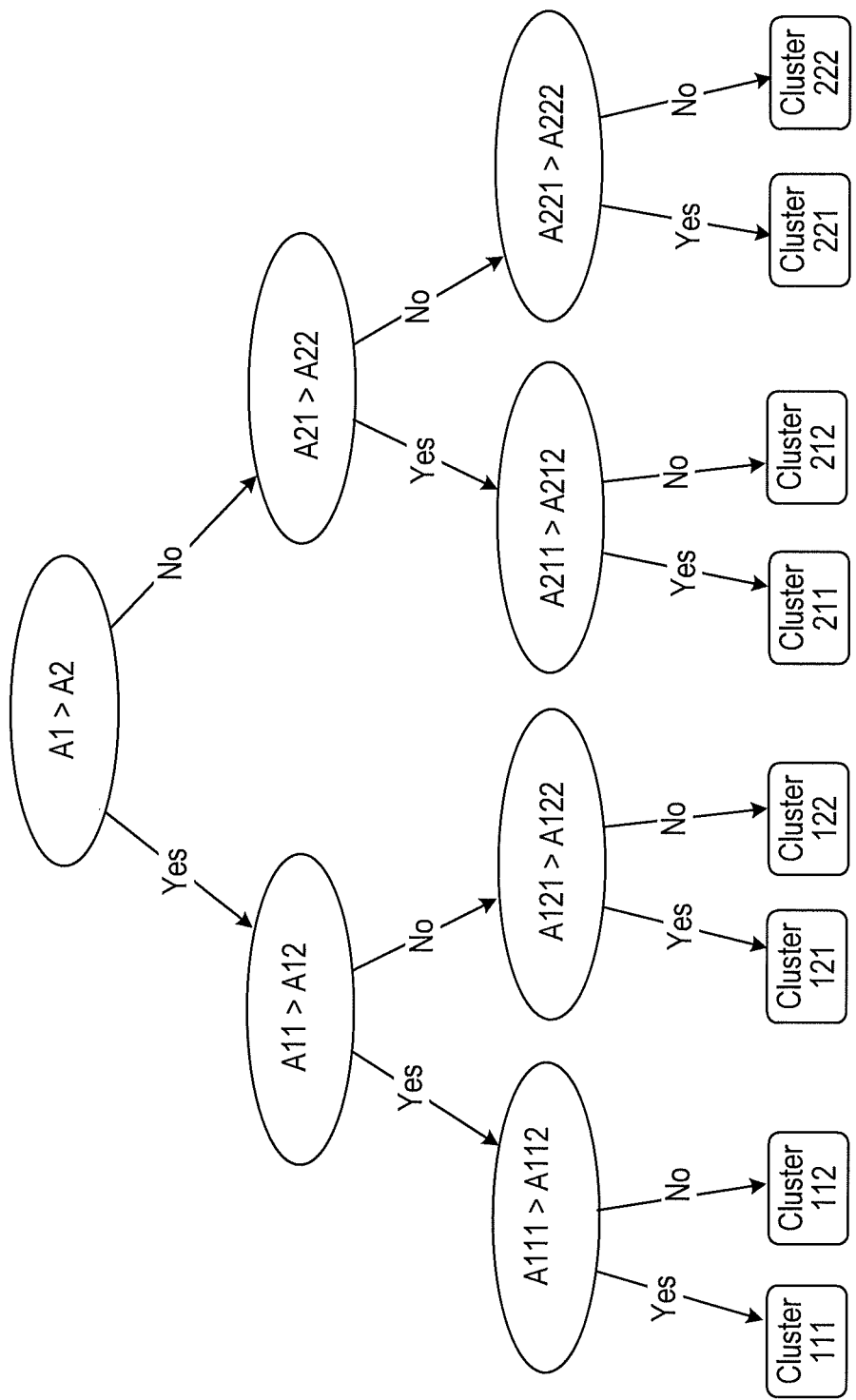
FIG. 10 is a graphical representation of a hierarchical scheme for assigning speaker category identification codes.

Revealing the cluster number to a recognizer used in an application indicates not only the final node, but the path taken down the tree if the numbering system includes that, as in FIG. 9. That path can be useful if the independent recognition system uses a larger cluster created by combining two lower clusters (perhaps because the company creating that recognizer has few examples of speakers in some lower clusters). This may be one motivation for using a decision tree as the preferred method.

The method can be adapted if experimentation determines that taking into account the channel (e.g., mobile phone versus landline phone) is beneficial. The adaptation of the methodology can have at least two forms:

1. The channel can be characterized as a variable associated with each speaker used in developing the decision tree. This variable can be used in the decision tree as an optional variable if it clusters the speakers usefully. Thus, the channel may be implicit in the cluster number if this approach is used, and no special effort by the speech recognition application is necessary to take this into account, except to specify the channel type through which the speech was gathered. This approach then has the advantage of empirically determining if a channel is useful in splitting a specific cluster. This approach has the powerful attribute that it doesn't distinguish channels for speakers where that distinction doesn't improve recognition, allowing limited speech data to be used more effectively.
2. Different decision trees and thus clusters can be developed for different channels. The application then simply uses the tree developed for that channel.

A number of embodiments have been described. Nevertheless, it will be understood that various modifications may be made without departing from the spirit and scope of the present disclosure.

For example, the computer system 100 can include a wide variety of network devices and/or applications that interact with one another in a variety of ways.

Certain steps that have been described as being performed by a particular network device, server or application may be performed by some other entity on behalf of the network device, server or application. For example, the speech recognition engines that the specification describes as having been created by the application may, instead, be created by an engine developer on behalf of the application and made available to the application. The various steps described can be re-ordered and can overlap in a variety of ways. The speech management server system and/or its functionality can be either localized to one machine/location or could be distributed across multiple machines at one or more physical locations.

Various functionalities (e.g., recognizing, comparing and clustering) can be combined into one module or can be distributed among several different modules.

A service can be provided that allows a number to be linked to data that the individual wants the application to use for increased accuracy and/or convenience, such as a contact list with phone numbers and email addresses, as well as the cluster ID. The same service that discovers the speaker category identification code can, in some instances, offer this as an option, perhaps tying it to an email address. Speaker-specific data could include a specialized vocabulary list for the recognizer to optionally incorporate.

A service can be provided where there is the possibility of different speaker codes over different channels, e.g., one over a mobile phone voice channel and one over the data channel, another using a microphone on a PC, etc. If an individual enrolls over more than one channel for this purpose, they could be given a longer code that can be interpreted as multiple cluster numbers.

There could be expansions over time by splitting a terminal cluster into two clusters when enough data is available, or by an alternative split of a higher cluster, with the difference being delivered with the development tools to service providers and the older variation being preserved.

The techniques disclosed herein can be deployed as a service in the network; or as licensed software for the network devices such as a mobile phone, touch pad, or PC, or for others to provide such network-based services.

Cluster creation can be implemented using "agglomerative" clustering, where the closest pairs of speakers form the smallest clusters, and the clusters are successively grouped until there are enough in a group to form a statistically significant group. A new speaker is then placed in the cluster "closest" to that speaker. Closeness can be measured with a recognizer created using all the speech data in a cluster. A system may use another measure, such as average confidence scores delivered by a recognizer, rather than speech recognition accuracy as the distance measure.

A speaker categorization can be created for a specific environment, e.g., mobile phones, if all the data comes from that channel. Separate categorizations (separate hierarchical trees in the preferred embodiment) can be created for different environments.

Categories can be split into more narrow categories as more data on a category becomes available. The split may be done, for example, by utilizing methods that were used to create the categories originally.

In some implementations, applications themselves can in effect be categorized. Language models for an application can be categorized from text files, rather than speech files. General speech-to-text applications such as dictating emails, text messages, converting voice notes to text, or converting voicemail messages to text are some of the most general applications, with typically large vocabularies and little limitation on syntax. Other applications are more focused, e.g., a street address for entry into a navigation system in an automobile.

Some narrowing of context is simple; when one is dialing by voice, it may be appropriate to limit the language model to the contacts in the list. The approach described goes beyond these simple cases. As in the acoustic model categorization, one approach is to use empirical methods to create categories, not base the categories on a priori assumptions. One objective is to allow the text data collected from multiple applications to be used to create such categories, reducing the amount of data needed from individual applications. As a simple example, "Super Bowl Sunday" is likely to be mentioned in emails, text messages, and voice notes, among other contexts.

The Super Bowl example also illustrates the value of this methodology in another dimension. If an application were launched in March, that phrase or other seasonal phrases such as "Valentine's Day" might not occur frequently in months of data collected after the launch, so that a more robust model would include the use of data collected in another application launched earlier.

One objective of having categories of language models may be, as with acoustic models, more accuracy with less processing. For example, one suspects that the vocabulary and word usage in text messages or emails sent by a teenager will be quite different from those sent by a businessman who doesn't text often, but uses emails mostly for business matters. Similarly, emails sent by business executives are likely to have a different vocabulary than those sent by a parent who is staying at home to raise young children.

As discussed herein, one step in the process of generating categories is identifying similarity (e.g., a distance) between two speech corpuses. One embodiment is a measure that requires compiling for each corpus:

The individual vocabulary words and their frequency expressed as a probability $p_{i1}, p_{ij}, \ldots, p_{iN}$, where N is the number of unique words;

Bigrams (all pairs of adjacent words in the corpus, order preserved) and their frequency $p_{ji}, p_{jj}, \ldots, p_{jM}$, where M is the number of unique bigrams; and Trigrams (all triples of adjacent words in the corpus, order preserved) and their frequency, $p_{3i}, p_{3j}, \ldots, p_{3M}$, where M is the number of unique trigrams.

The above counts can optionally use an equivalency table when different spellings are considered equivalent (e.g., "1"="one" or "center"="centre"). Two corpuses may be considered most similar if the preceding lists and frequencies (probabilities) are exactly the same (an unlikely result, of course). To come up with a similarity score, the development system, for example, calculates a combined matching score over each of the cases listed above.

The probability of a specific word, bigram, or trigram in each corpus can be computed. For each word, bigram, and trigram, the magnitude of the difference in the probabilities of each of these items between two text corpuses is a measure of the difference between the corpuses. Three scores are computed for the three categories (words, bigrams, and trigrams) by summing the absolute value (magnitude) of the difference in probabilities for matching items. This probability difference will be zero for a perfect match, so a low score indicates a close match and a high score indicates a poor match between the text corpuses.

Suppose the scores for the three categories are $S_i(i)$, $S_j(i)$, and $S_3(i)$ for corpus i. A match score for corpuses i and j is $S_{ij}=S_i(i)/a_{ij}+S_j(i)/b_{ij}+S_3(i)/c_{ij}$, where $a_{ij}$ is the total number of unique words in both corpuses i and j taken together, $b_{ij}$ is the total number of unique bigrams in i and j taken together, and $c_{ij}$ is the total number of unique trigrams in i and j taken together. This gives equal weight to individual word matches, bigram matches, and trigram matches.

In some implementations, clusters of corpuses can be split up into smaller clusters until the smallest corpus is just large enough to create a Statistical Language Model in order to create a hierarchical decision tree similar to FIG. 9. Other stopping criteria are possible as well including, for example, a set target number of corpuses.

Splitting clusters can, in some instances, result in a number of corpuses that use similar words and word combinations, which might correspond, for example, to cases mentioned before, such as teenagers texting, but don't make any such a priori assumptions. A similarity measure can be used at each node to decide the path down the tree for a new corpus for which the appropriate category is being identified.

In some implementations, speech recognition developers can use a cluster of corpuses to develop an SLM for that cluster using their own text corpus or one provided by a developer of the hierarchical tree.

According to certain embodiments, an application developer develops a corpus of sentences or phrases that were spoken to its application. That corpus is submitted to software (perhaps web-based). The software uses one or more of the methods described herein to find the corpus' cluster. The resulting corpus identifier then indicates which corpus is the best match. That corpus identifier is then a good indication of the language model that will give the best results in speech recognition or other applications of SLMs. The application developer can provide this information as part of the application (or service), or it can be registered with the service that provides the category identification service.

The cluster number may cover many applications, and thus an SLM specific to an application need not be independently developed. The SLM can in some instances be used in combination with a speaker category to optimize the speech recognition accuracy and efficiency.

A useful implementation detail is that the corpuses need not be stored as full text. Only the word lists, bigrams, and trigrams of a corpus are used in matching corpuses, not the original text corpuses. A developer need not submit an original corpus, but only the coded words, bigrams, and trigrams.

A third category of factors affecting speech recognition is the device audio input characteristics (quality and placement of microphone, how device is held—e.g., in speakerphone/video-call mode versus near mouth), the channel transmission characteristics (mobile versus landline phone, voice versus data channel on a mobile phone, use of Bluetooth headset), and noise background level (impacted by possible noise reduction techniques in the device). This complex of interacting possibilities, some of which may vary from interaction to interaction for a single user (e.g., noise or the use of a Bluetooth headset with a mobile phone), challenges speech recognition processing to either handle all these cases with the same model or do some sort of dynamic adaptation.

If one could characterize all these variations into a relatively small number of cases that were largely equivalent to a speech recognizer, then speech recognition parameters (acoustic models) could be tuned to these subsets, making the recognizer more accurate and potentially more efficient at the same time. Tuning to a specific environment can be implicit in speaker categorization if, for example, all the data is collected in a specific environment, e.g., over mobile phones; however, the classification of environments themselves can be done from a speech recognition equivalence point of view. A key issue in this domain is the information available to categorize the device, channel, and usage in a given interaction. The information that might be available to a service or software that a user or system launches includes, among other possibilities:

The device itself, e.g., a PC or mobile phone. The device could identify itself by a model number or standardized set of identifiers developed for this purpose. This information would be translated into a set of features used in the characterization of the device. These could include (1) whether noise reduction software or chips were included (noise reduction changes signal characteristics) and perhaps the type of noise reduction done (e.g., echo-cancelling, stationary noise removal, non-stationary noise removal, beam forming, psychoacoustic processing, auditory scene analysis), and (2) characteristics of the channel over which the voice signal is delivered.

The mode of operation when relevant. This may depend on the device self-reporting cases such as (1) speakerphone vs. close-talking mode vs. use of a Bluetooth headset, or (2) use of a wireless connection such as a Bluetooth headset or synchronization of a mobile phone with an automobile audio system with characteristics of its own.

Since the data being analyzed is speech data, the method used in categorizing speakers can be applied to this cross-speaker data gathered across devices and usage scenarios, resulting in a hierarchical categorization tree. The category best used for a particular device can be determined by submitting a corpus of data collected from the device to a categorization tree to determine the best category for that device.

Variation in this technique can occur when dynamic usage information is part of the description of the environment. A particularly important example of this is the use of a mobile phone in close talking mode or in speakerphone mode. This is an example of a change in the audio signal caused by usage rather than the device itself.

Adapting the method described previously to this case requires some modification. Speaker categorization may in some instances be based on static categorization. It can be adapted to be dynamic as follows.

In developing the decision tree, the system adds to the variables available at each node variables that designate dynamic conditions such as speakerphone mode, presuming that in the application that information will be delivered to the speech recognition service. At each point in the tree, a split is compared to determine by speaker characteristics (the recognizer scores) with a split determined by the condition variable. In those cases where a condition makes a better discrimination, the conditional variable is used to split that node. The test at each node is—the speech recognition accuracy achieved by the two groups split. For a significant change in environment, such as speakerphone mode versus close-talking, the system may be adapted to assume that environmental variables will make a big difference and will determine a split.

Suppose that this is the case, and that some nodes of the tree include dynamic variables identifying the use case. How does a service use such a tree when there is no single identifier per speaker? If the speaker has enrolled in only one case, and thus only one identifier is available for that speaker, there is no option. If the speaker is willing to enroll in two cases such as speakerphone mode and close-talking mode, the two corpuses can be treated independently, each with a variable describing the usage mode. When a corpus of speech from this user created during enrollment is processed through the decision tree, there will be a specific terminal node identified for each usage case. If these are different, then a code is added to the cluster identifier indicating the usage case. An application developer or engine developer can use the appropriate category depending on dynamic usage. If dynamic usage category is not identified during operation, the application can either default to the more common case or use a speaker model developed on a combination of the two categories.

Disclosed herein are methods for finding categories for speaker, device/user behavior, and device/channel differences. In various implementations, each individually generates a category number associated with a corpus of speech. Each can be used individually, or a developer can use categories of more than one type. The developer can do so, for example, by taking individual utterances in corpuses that have the same pair or triple of category numbers. This defines a set of utterances that fall into both or all three categories.

One potential difficulty of this approach is that the number of utterances that have the same two categories may be too small to estimate effective parameters, and, the case may be even more limited for three matching categories. The methodologies herein can be extended to group pairs or triplets of category numbers by similarity, providing a larger corpus for analysis. One method (described with three types of categories, but applicable to two types as well) is as follows:

The starting clusters are the minimal clusters created by (i) choosing all utterances within corpuses that have three category numbers assigned, and making a separate cluster for each unique triple, (j) then, all of the remaining utterances that have two categories assigned and making a starting cluster for each pair, and (3) then, taking the corpuses with only one category assignment as separate clusters. (It is assumed that only some speech data has been labeled by all three categories.) Treat each of these as an individual corpus, with variables attached to each corpus identifying any categories identified in prior analysis.

Use the previously described method of creating a hierarchical categorization tree using the category labels in conjunction with speech engine distance measures to create a tree which groups cases that can be addressed well by more narrow recognizers.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "processing module" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written to implement some of the techniques disclosed herein in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-based method comprising:
   storing a collection of speech corpuses in a database of a memory storage device, wherein each speech corpus is from a different speaker and comprises an audio file of speech and a transcription of the audio file;
   organizing the speech corpuses into clusters based on similarity from a speech recognition perspective,
   wherein organizing the speech corpuses comprises creating one or more speech recognition engines, each speech recognition engine being based on parameters associated with a corresponding speech corpus, producing recognized versions of the speech corpuses with the one or more speech recognition engines, calculating distances between at least two of the speech corpuses based on one or more recognized versions of the speech corpuses, and clustering the at least two speech corpuses based on the calculated distances;
   assigning a unique speaker category identification code to each of the clusters; and
      outputting at least one identification code to a speech recognition application configured to characterize speech based on the at least one identification code.

2. The computer-based method of claim 1 wherein, for each corpus, creating the corresponding speech recognition engine comprises:
   applying a statistically-based speech recognition algorithm to the speech corpus.

3. The computer-based method of claim 1 wherein organizing the speech corpuses into clusters comprises:
   (a) creating a first speech recognition engine based on a first one of the speech corpuses;
   (b) applying the first speech recognition engine to produce a recognized version of a second one of the speech corpuses; and
   (c) calculating a first edit distance between the recognized version of the second one of the speech corpuses and the transcription of the second one of the speech corpuses.

4. The computer-based method of claim 3 wherein organizing the speech corpuses into clusters comprises:
   (d) organizing the second speech corpus into the same cluster as the first speech corpus if the first edit distance is less than a particular value.

5. The computer-based method of claim 3 wherein organizing the speech corpuses into clusters further comprises:
   (d) creating a second speech recognition engine based on 30 the second one of the speech corpuses;
   (e) applying the second speech recognition engine to produce a recognized version of the first speech corpus; and
   (f) calculating a second edit distance between the recognized version of the first speech corpus and the transcription of the first one of the speech corpuses.

6. The computer-based method of claim 5 further comprising:
   (g) calculating an effective edit distance between the first speech corpus and the second speech corpus based on the first and second edit distances; and
   (h) organizing the first and second speech corpuses into the same cluster if the effective edit distance is less than a particular value.

7. The computer-based method of claim 1 wherein organizing the speech corpuses into clusters based on similarity from a speech recognition perspective comprises:
   identifying two of the speech corpuses that are most dissimilar from a speech recognition perspective;
   creating a first cluster associated with a first one of the identified speech corpuses and a second cluster associated with a second one of the identified speech corpuses;
   organizing all of the speech corpuses that are more similar to the first one of the identified speech corpuses than to the second one of the identified speech corpuses into the first cluster; and
   organizing all of the speech corpuses that are more similar to the second one of the identified speech corpuses than to the first one of the identified speech corpuses into the second cluster.

8. The computer-based method of claim 1, wherein organizing the speech corpuses into clusters based on similarity from a speech recognition perspective comprises creating the clusters without expressing the clusters explicitly as points in a Euclidian space, but by using distances between the clusters,
   wherein the distances are measured by using one or more of the speech recognition engines to facilitate creating a distance measure between any two of the speech corpuses.

9. The computer-based method of claim 1, wherein organizing the speech corpuses into clusters based on similarity from a speech recognition perspective comprises:
   representing each one of the speech corpuses as a point in a Euclidean space; and
   using one or more of the speech recognition engines to determine a distance measure in the Euclidian space between pairs of the speech corpuses,
   wherein N corpuses correspond to an (N−1) dimensional Euclidian space to preserve the distances measures, and
   wherein the (N−1) dimensional Euclidian space can be reduced in dimension and thus made denser by implementing one or more statistical methods.

10. The computer-based method of claim 1 wherein each of the unique speaker identification codes includes information that facilitates identifying one or more other clusters that are related to the corresponding cluster from a speech recognition perspective.

11. The computer-based method of claim 1 further comprising:
   reorganizing all of the speech corpuses associated with a first one of the speaker identification codes and a second speaker identification code into one new cluster based on information in the first or second speaker identification codes that indicates the corresponding clusters are related to one another from a speech recognition perspective, allowing one speech recognition engine to be generated that applies to the two speaker identification codes.

12. The computer-based method of claim 1 wherein one or more of the speaker identification codes identifies an environment in which the speech sample was created.

13. The computer-based method of claim 1 comprising:
   receiving a recording of an individual speaking; and
   identifying the speech corpus cluster with which the received recording is most closely associated, wherein outputting the at least one identification code comprises outputting the speaker category identification code of the speech corpus cluster with which the received recording is most closely associated.

14. The computer-based method of claim 13 wherein the speaker category identification code identifies, for an application, an application-specific speech-recognition engine that is, out of a plurality of speech-recognition engines, the most accurately tuned to a speaker type associated with the individual.

15. A computer system comprising:
   a memory storage device with a database storing a collection of speech corpuses, wherein each speech corpus is from a different speaker and comprises an audio file of speech and a transcription of the audio file;
   a speech recognition engine generation module to create, for each speech corpus, a corresponding speech recognition engine based on parameters associated with the speech corpus;
   one or more speech recognition engines created with the speech recognition engine generation module, wherein each speech recognition engine is adapted to produce a recognized version of the audio files of the speech corpuses;
   a comparison module to calculate distances between two or more of the speech corpuses based on the recognized versions; and
   a clustering module to organize the speech corpuses into clusters based on the calculated distances, wherein the computer system is adapted to assign a unique speaker category identification code to each of the clusters and to output at least one identification code to a speech recognition application configured to characterize speech based on the at least one identification code.

16. The computer system of claim 15 wherein the speech recognition engine generation module is further adapted to:
   (a) create a first speech recognition engine based on a first one of the speech corpuses; and
   (b) apply the first speech recognition engine to produce a recognized version of a second one of the speech corpuses, and
   wherein the comparison module is further adapted to calculate the distance as a first edit distance between the recognized version of the second one of the speech corpuses and the transcription of the second one of the speech corpuses.

17. The computer system of claim 16 wherein the clustering module is further adapted to organize the second speech corpus into the same cluster as the first speech corpus if the first edit distance is less than a particular value.

18. The computer system of claim 16 wherein the speech recognition engine generation module is further adapted to:
   (c) create a second speech recognition engine based on the second one of the speech corpuses; and
   (d) apply the second speech recognition engine to produce a recognized version of the first speech corpus, and
   wherein the comparison module is further adapted to calculate a second edit distance between the recognized version of the first speech corpus and the transcription of the first one of the speech corpuses.

19. The computer system of claim 18 wherein the comparison module is further adapted to: calculate an effective edit distance between the first speech corpus and the second speech corpus based on the first and second edit distances; and organize the first and second speech corpuses into the same cluster if the effective edit distance is less than a particular value.

20. The computer system of claim 15 wherein a speech recognition engine is created for each speaker category code for use by an application provider when the speaker category code is provided to the application.

21. The computer system of claim 15 where the system is adapted to:
   receive a recording of an individual speaking;
   identify a speech corpus cluster with which the received recording is most closely associated; and
   output a speaker category identification code of the speech corpus cluster with which the received recording is most closely associated.

22. The computer system of claim 21 wherein the speaker category identification code that is output identifies, for an application, an application-specific speech-recognition engine that is, out of a plurality of speech-recognition engines, the most accurately tuned to a speaker type associated with the individual.

* * * * *